US011949253B2

United States Patent
Chung et al.

(10) Patent No.: US 11,949,253 B2
(45) Date of Patent: Apr. 2, 2024

(54) ELECTRONIC DEVICE FOR TRANSMITTING WIRELESS POWER AND METHOD FOR WIRELESS CHARGING THEREOF

(71) Applicant: Samsung Electronics Co., Ltd., Gyeonggi-do (KR)

(72) Inventors: Hyungkoo Chung, Gyeonggi-do (KR); Kihyun Kim, Gyeonggi-do (KR); Dongzo Kim, Gyeonggi-do (KR); Jihye Kim, Gyeonggi-do (KR); Yunjeong Noh, Gyeonggi-do (KR); Keyic Son, Gyeonggi-do (KR); Taehyeon Yu, Gyeonggi-do (KR); Kyungmin Lee, Gyeonggi-do (KR); Mincheol Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 162 days.

(21) Appl. No.: 17/578,712

(22) Filed: Jan. 19, 2022

(65) Prior Publication Data

US 2022/0247239 A1 Aug. 4, 2022

Related U.S. Application Data

(63) Continuation of application No. PCT/KR2022/000600, filed on Jan. 13, 2022.

(30) Foreign Application Priority Data

Jan. 29, 2021 (KR) .................. 10-2021-0013000

(51) Int. Cl.
*H02J 50/80* (2016.01)
*H02J 50/10* (2016.01)
(Continued)

(52) U.S. Cl.
CPC .............. *H02J 50/80* (2016.02); *H02J 50/10* (2016.02); *H02J 50/402* (2020.01); *H02J 50/90* (2016.02)

(58) Field of Classification Search
CPC .......... H02J 50/10; H02J 50/402; H02J 50/80; H02J 50/90
(Continued)

(56) References Cited

U.S. PATENT DOCUMENTS 10,547,209 B2  1/2020  Park et al.
10,601,251 B2  3/2020  Keith et al.
(Continued)

FOREIGN PATENT DOCUMENTS

KR  10-2013-0106706  9/2013
KR  1020170041389  4/2017
(Continued)

OTHER PUBLICATIONS

International Search Report dated Apr. 19, 2022 issued in counterpart application No. PCT/KR2022/000600, 11 pages.

*Primary Examiner* — Hal Kaplan
(74) *Attorney, Agent, or Firm* — The Farrell Law Firm, P.C.

(57) ABSTRACT

A power transmission device is provided for transmitting power. The power transmission device includes a power transmitter including a plurality of coils, and a processor configured to wirelessly transmit power to a power reception device through at least one coil among the plurality of coils, identify a condition indicating a state in which a coil to transmit power related to charging of the power reception device is to be reconfigured, transmit a CSP to the power reception device, in response to identifying the condition, based on the predetermined condition, identify an SSP of at least one other coil adjacent to at least one coil, and wirelessly transmit power to the power reception device through a coil having a largest SSP among an SSP of the at least one coil and the identified SSP of the at least one other coil.

20 Claims, 19 Drawing Sheets

(51) Int. Cl.
 *H02J 50/40* (2016.01)
 *H02J 50/90* (2016.01)

(58) Field of Classification Search
 USPC .......................................................... 307/104
 See application file for complete search history.

(56) References Cited

U.S. PATENT DOCUMENTS

| | | | |
|---|---|---|---|
| 10,862,351 | B2 | 12/2020 | Park |
| 2018/0287413 | A1 | 10/2018 | Jung |
| 2019/0058360 | A1 | 2/2019 | Garbus et al. |
| 2020/0227932 | A1* | 7/2020 | Kim ........................ H02J 50/80 |

FOREIGN PATENT DOCUMENTS

| | | |
|---|---|---|
| KR | 1020170041891 | 4/2017 |
| KR | 1020180042578 | 4/2018 |
| KR | 10-1849046 | 5/2018 |
| KR | 10-2018-0097250 | 8/2018 |
| KR | 10-1974155 | 4/2019 |
| KR | 1020190061359 | 6/2019 |
| KR | 10-1994739 | 7/2019 |
| KR | 1020190112979 | 10/2019 |
| KR | 1020200107903 | 9/2020 |
| WO | WO 2019/039898 | 2/2019 |

\* cited by examiner

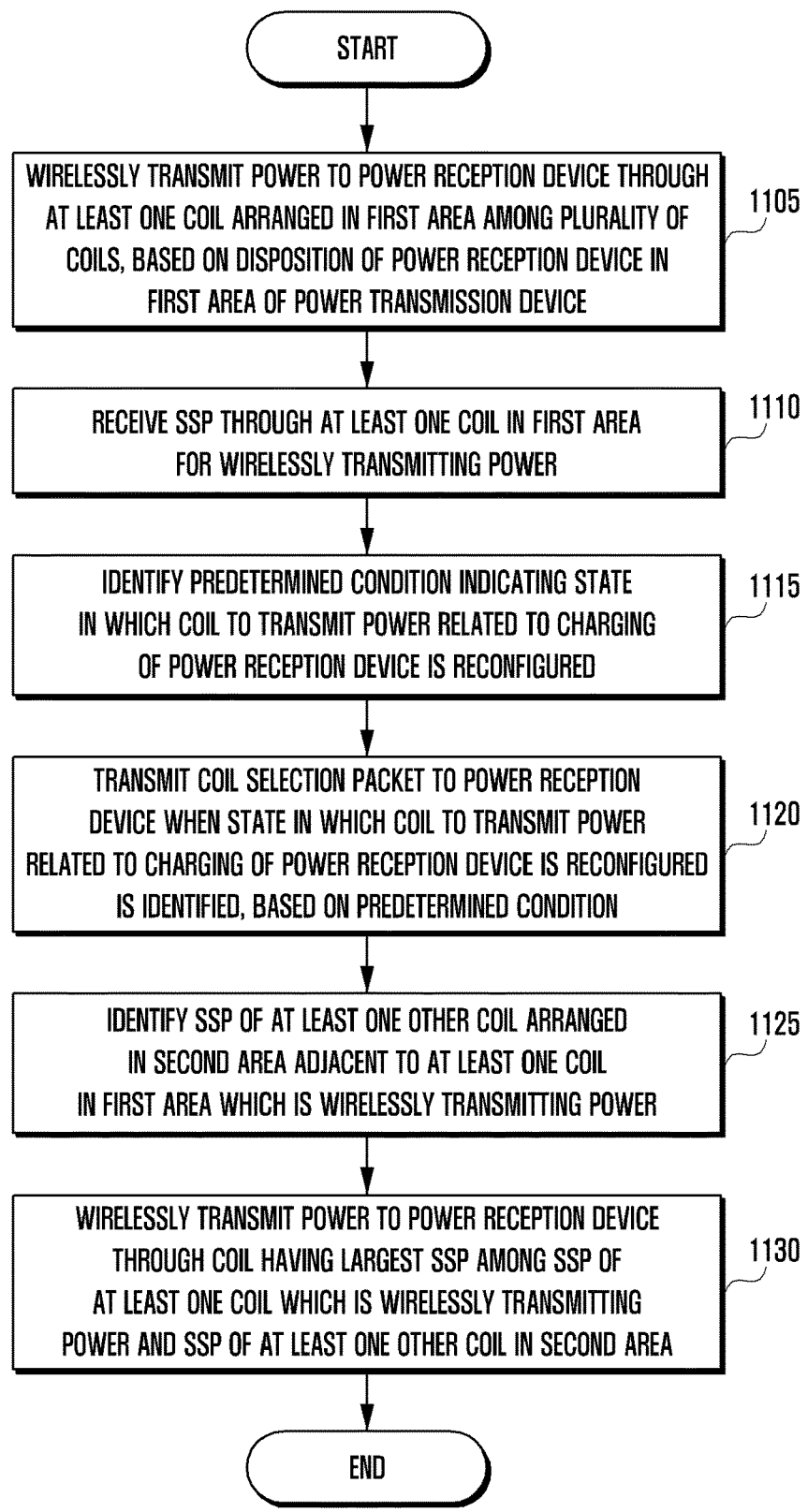

ELECTRONIC DEVICE FOR TRANSMITTING WIRELESS POWER AND METHOD FOR WIRELESS CHARGING THEREOF

CROSS-REFERENCE TO RELATED APPLICATIONS

This application is a Bypass Continuation Application of International Application No. PCT/KR2022/000600, which was filed on Jan. 13, 2022, and is based on and claims priority under 35 U.S.C. § 119 to Korean Patent Application No. 10-2021-0013000, which was filed in the Korean Intellectual Property Office filed on Jan. 29, 2021, the entire disclosure of each of which is incorporated herein by reference.

BACKGROUND

1. Field

The disclosure relates generally to an electronic device for transmitting wireless power and a method of performing wireless charging using the same.

2. Description of Related Art

An electronic device may perform wireless charging or non-contact charging through a wireless power transfer technology. The wireless power transfer technology may include wirelessly transmitting power from a power transmission device to a power reception device to charge a battery of the power reception device without a wired connection between the power reception device and the power transmission device. The wireless power transfer technology may include a magnetic inductive type transfer and a magnetic resonant type transfer, or other types of wireless power transmission technology.

When a battery of a power reception device is wirelessly charged by a power transmission device, the power reception device may not be properly aligned with the power transmission device. In this case, the power transmission device may stop transmitting power to the power reception device.

Additionally, when the power reception device is not properly aligned with the power transmission device, a conductive area of the power reception device may be located on a coil of the power transmission device. In this case, the power transmission device and the power reception device may generate heat. Accordingly, charging efficiency may be reduced, and a time for charging the power reception device may increase.

SUMMARY

The disclosure is provided to address at least the above-mentioned problems and/or disadvantages and to provide at least the advantages described below.

An aspect of the disclosure is to provide a power transmission device and method thereof, which may switch from a coil for transmitting power to a power reception device to a different coil having better efficiency, in response to determining that the power reception device is not aligned with the power transmission device based on a predetermined condition.

In accordance with an aspect of the disclosure, a power transmission device is provided for transmitting power. The power transmission device includes a power transmitter including a plurality of coils, and a processor configured to wirelessly transmit power to a power reception device through at least one coil among the plurality of coils, identify a condition indicating a state in which a coil to transmit power related to charging of the power reception device is to be reconfigured, transmit a coil selection packet (CSP) to the power reception device, in response to identifying the condition, identify a signal strength packet (SSP) of at least one other coil adjacent to the at least one coil, and wirelessly transmit power to the power reception device through a coil having a largest SSP among an SSP of the at least one coil and the identified SSP of the at least one other coil.

In accordance with another aspect of the disclosure, a power reception device is provided for receiving power. The power reception device includes a power receiver including a plurality of reception coils, and a processor configured to wirelessly receive power from a power transmission device through the power receiver, identify, when the received power is smaller than a predetermined power value, whether a state in which the received power is smaller than the predetermined power value is maintained for a predetermined time, and transmit a CSP to the power transmission device, in response to the state in which the received power is smaller than the predetermined power value being maintained for the predetermined time.

In accordance with another aspect of the disclosure, a method is provided for performing wireless charging by a power transmission device. The method includes wirelessly transmitting power to a power reception device through at least one coil among a plurality of coils, identifying a condition indicating a state in which a coil to transmit power related to charging of the power reception device is to be reconfigured, transmitting a CSP to the power reception device, in response to identifying the condition, based on the predetermined condition, identifying an SSP of at least one other coil adjacent to the at least one coil, and wirelessly transmitting power to the power reception device through a coil having a largest SSP among an SSP of the at least one coil and the identified SSP of the at least one other coil.

BRIEF DESCRIPTION OF DRAWINGS

The above and other aspects, features, and advantages of certain embodiments of the disclosure will be more apparent from the following description taken in conjunction with the accompanying drawings, in which:

FIG. 11 is a flowchart illustrating a method of performing wireless charging by a power transmission device according to an embodiment;

DETAILED DESCRIPTION

Hereinafter, various embodiments of the disclosure will be described in detail with reference to accompanying drawings. Descriptions of well-known functions and constructions are omitted for the sake of clarity and conciseness.

Figure 1:
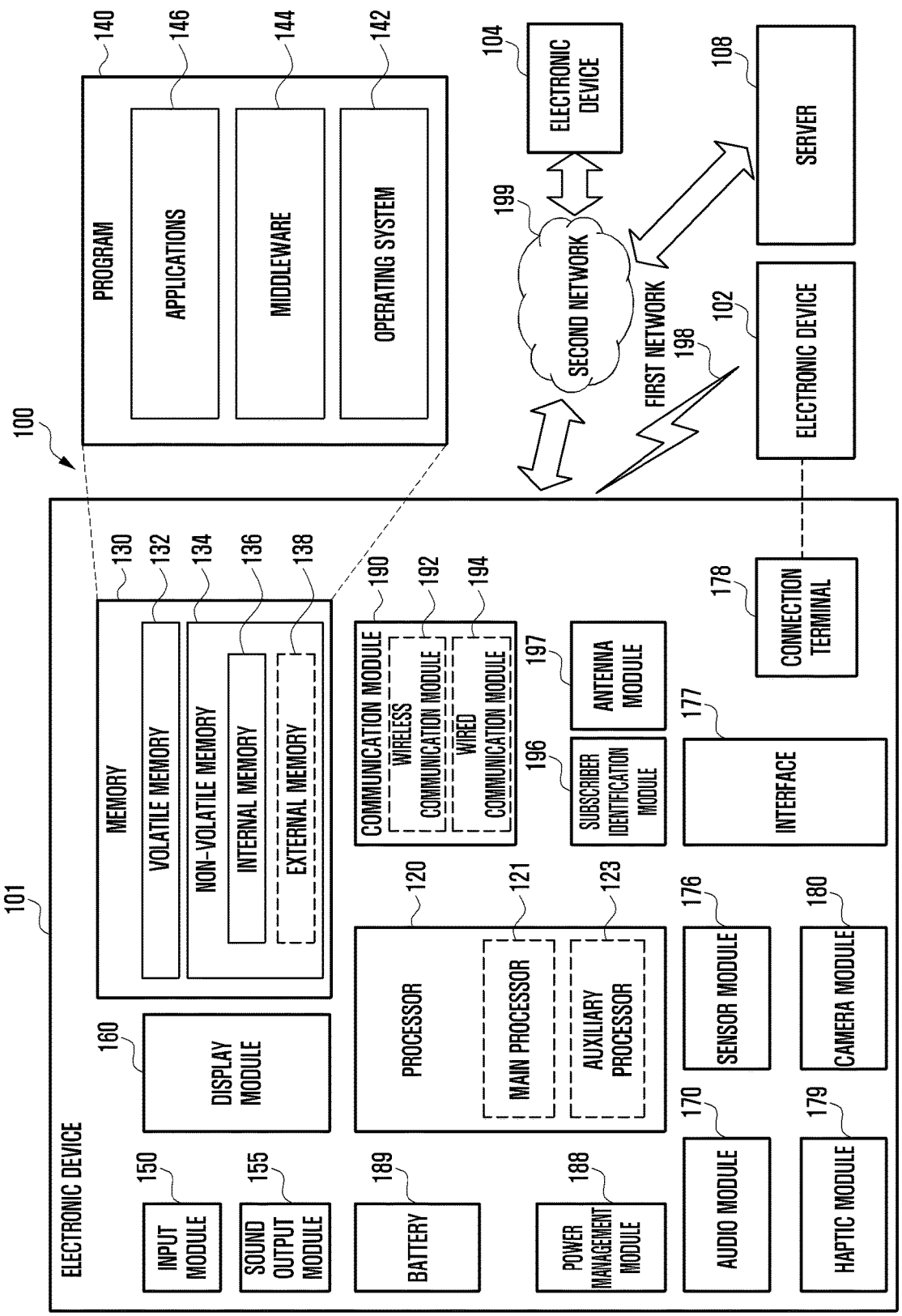
FIG. 1 illustrates an electronic device in a network environment according to an embodiment.

FIG. 1 illustrates an electronic device 101 in a network environment 100 according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123, According to an embodiment, the auxiliary processor 123 (e.g., the NPU) may include a hardware structure specified for artificial intelligence (AI) model processing. An AI model may be generated by machine learning. Such learning may be performed, e.g., by the electronic device 101 where the AI is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network, or a combination of two or more thereof, but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images, According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or IR data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., an mmwave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
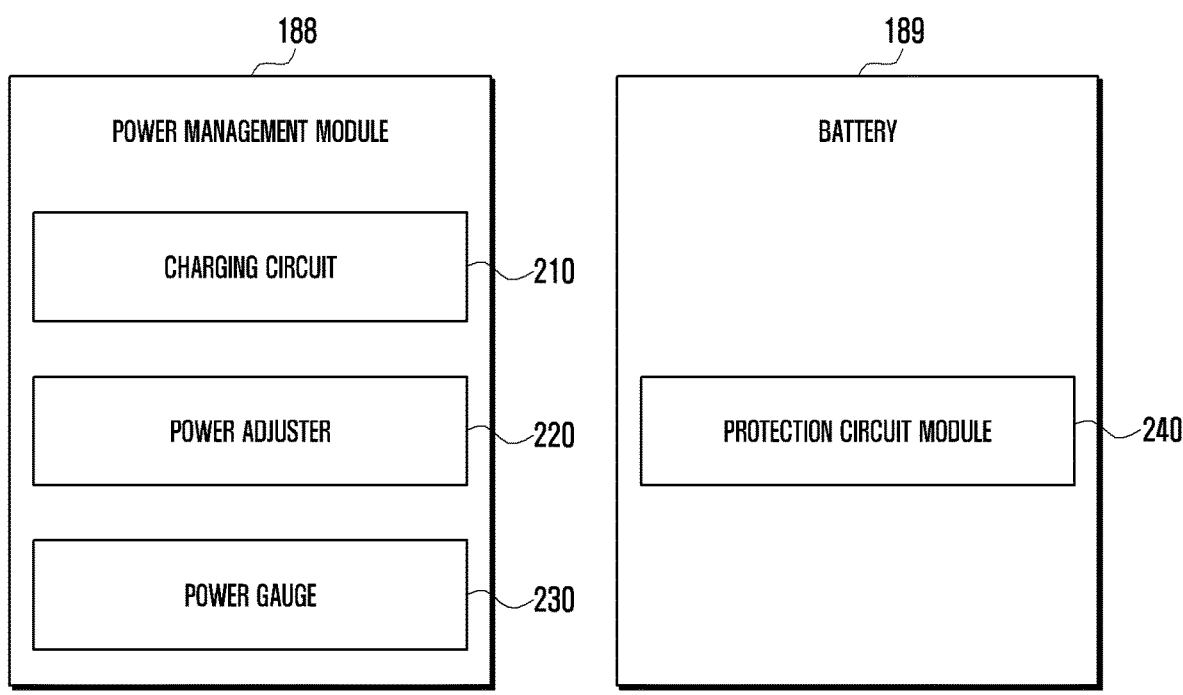
FIG. 2 illustrates a power management module and a battery according to an embodiment.

FIG. 2 illustrates a power management module and a battery according to an embodiment.

Referring to FIG. 2, a power management module 188 may include charging circuitry 210, a power adjuster 220, or a power gauge 230. The charging circuitry 210 may charge a battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, aver voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3A:
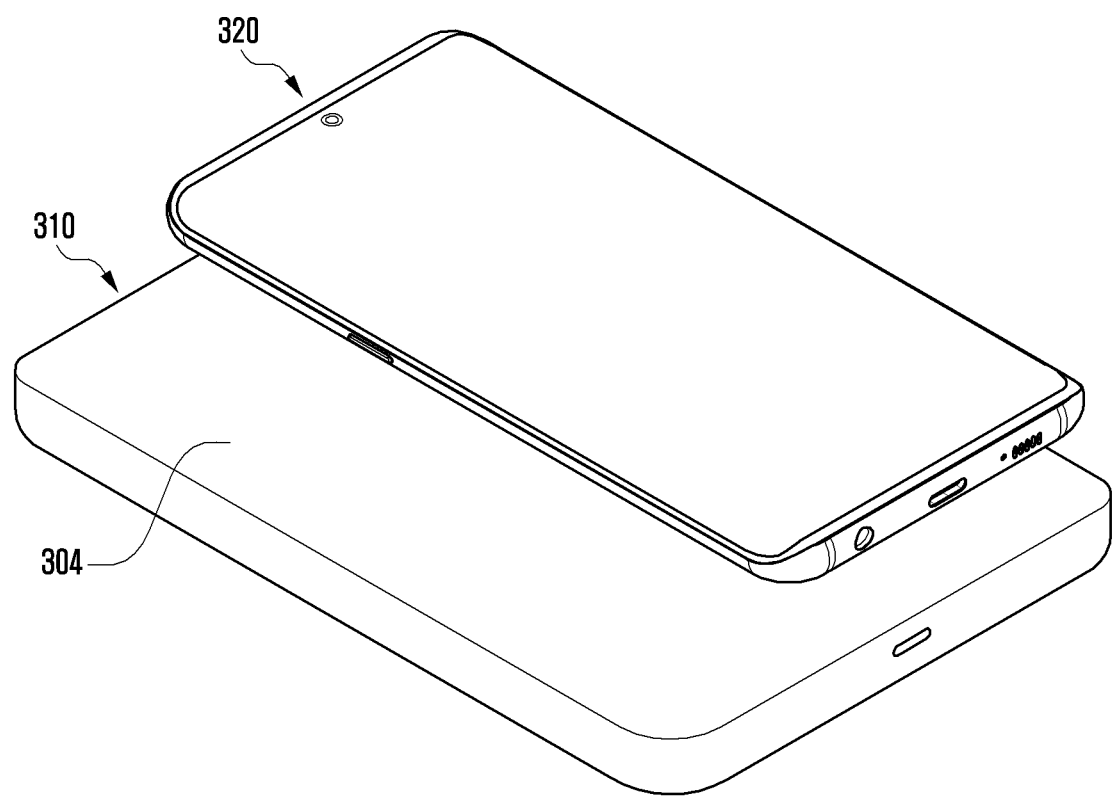
FIG. 3A illustrates a power transmission device charging a power reception device according to an embodiment.

FIG. 3A illustrates a power transmission device charging a power reception device according to an embodiment.

Referring to FIG. 3A, a power transmission device 310 may wirelessly transmit power to charge a power reception device 320. For example, when a battery of the power reception device 320 is discharged or has low power (e.g., a level less than a specified level), the power transmission device 310 may wirelessly transmit power to charge the battery of the power reception device 320.

The power reception device 320 may be a smartphone, as illustrated in in FIG. 3A, or a wearable device (e.g., watch), a tablet, a wireless earphones, etc. The power transmission device 310 may be identical or similar to the power reception device 320. The power transmission device 310 may include one or more components comparable to those of the electronic device 101 illustrated in FIG. 1.

While waiting to charge the power reception device 320, the power transmission device 310 may detect that the power reception device 320 is placed on (e.g., adjacent to or in contact with) a housing 304, e.g., an upper portion of the housing 304 of the power transmission device 310, a surface adjacent to a coil for wireless charging, or a surface in the direction in which the magnetic force of the coil for wireless charging is transmitted.

The power transmission device 310 may transmit a first ping signal analog ping signal, a Q ping signal, or a digital ping signal) through a coil for wireless charging periodically or at a specified time to the power reception device 320 to check whether the power reception device 320 is adjacent to or in contact with the power transmission device 310. In response to the first ping signal from the power transmission device 310, the power reception device 320 may transmit a feedback signal (e.g., a response signal, identification information, configuration information, and/or an SSP signal) to the power transmission device 310. For example, the Q ping signal is a type of analog ping signal, and may be used to identify the degree of matching in the resonance point of the coil by detecting change in a signal applied to the coil of the power transmission device 310 (e.g., changes in current, voltage, and/or frequency).

Based on the first ping signal for determining whether the power reception device 320 is placed on the housing 304 of the power transmission device 310, the power transmission device 310 may determine whether the power reception device 320 (or another object including metal) is placed on the housing 304. For example, the power transmission device 310 may identify a change in electrical energy (e.g., current or voltage) measured when the first ping signal is transmitted, and may determine whether the power reception device 320 is present based on the identified change in electrical energy. Upon determining that the power reception device 320 is present, the power transmission device 310 may adjust at least some of a plurality of parameters related to the first ping signal.

A guide (e.g., an indicator) for the location at which the power reception device 320 is to be placed (e.g., coil location or chargeable location) may be indicated on the upper portion of the housing 304 of the power transmission device 310.

Figure 3B:
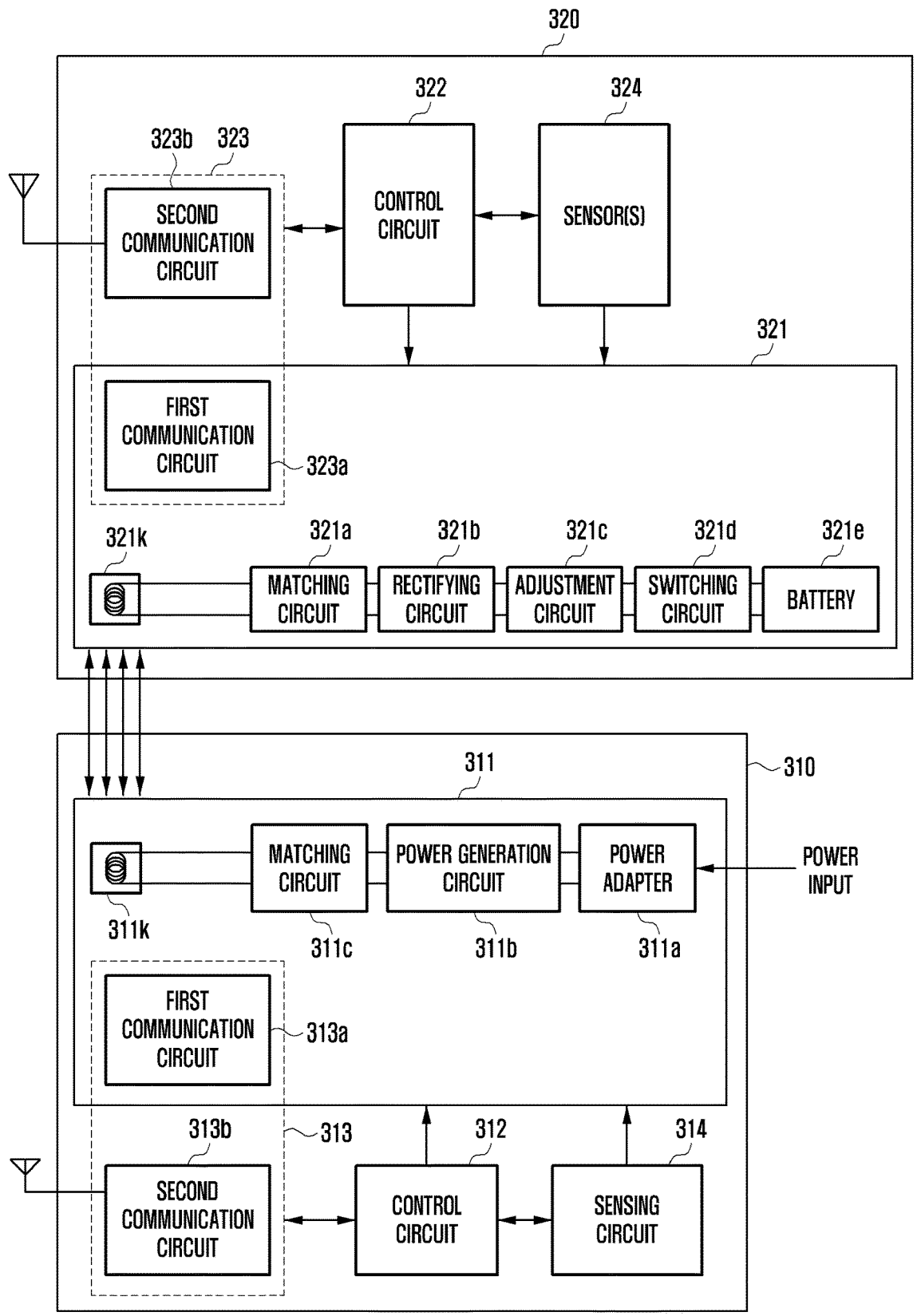
FIG. 3B illustrates a wireless charging environment of a power transmission device and a power reception device according to an embodiment.

FIG. 3B illustrates a wireless charging environment of a power transmission device and a power reception device 320 according to an embodiment.

Referring to FIG. 3B, when the power reception device 320 is placed on or near the power transmission device 310, the power transmission device 310 may wirelessly transmit power to charge a battery 321e of the power transmission device 310.

The power transmission device 310 includes a power transmitter 311, a control circuit 312, a communication circuit 313, and a sensing circuit 314.

The power transmitter 311 may receive power from an external power source (e.g., a commercial power source, an auxiliary battery device, a laptop computer, a desktop computer, or a smartphone).

The power transmitter 311 includes a power adapter 311a, a power generation circuit 311b, a matching circuit 311c, and a power transmission coil 311k.

The power adapter 311a may convert the voltage of power input from an external power source (e.g., a travel adapter (TA)). The power generation circuit 311b may generate power for power transmission from the converted voltage. The matching circuit 311c may maximize efficiency between the power transmission coil 311k and a power reception coil 321k of the power reception device 320.

When wirelessly transmitting power to a plurality of power reception devices 320, the power transmission unit 311 may multiple power adapters 311a, power generation circuits 311b, matching circuits 311c, and/or power transmission coils 311k.

The power transmission coil 311k may include a plurality of coils grouped on the same layer and/or different layers. The power transmission device 310 may select some of the plurality of coils disposed on the same layer and/or different layers to charge the power reception device 320.

The control circuit 312 may control the overall operation of the power transmission device 310 to transmit power. The control circuit 312 may be operatively connected with the power transmitter 311, the communication circuit 313, and the sensing circuit 314. The control circuit 312 may generate various messages for wireless power transmission and transmit them to the communication circuit 313. Based on information received from the power reception device 320 through the communication circuit 313 the control circuit 312 may calculate the power or the amount of power to be transmitted to the power reception device 320. The control circuit 312 may control the power transmitter 311 to transmit the calculated amount of power to the power reception device 320 through the power transmission coil 311k.

The communication circuit 313 includes a first communication circuit 313a and a second communication circuit 313b. The first communication circuit 313a may communicate with a first communication circuit 323a of the power reception device 320 by using a frequency identical or close to the frequency used by the power transmission coil 311k for wireless power transmission (e.g., in-band communication using the power transmission coil 311k to transmit a power signal or a communication signal). The second communication circuit 313b may communicate with a second communication circuit 323b of the power reception device 320 by using a frequency that is different from the frequency used by the power transmission coil 311k for wireless power transmission (e.g., out-band communication using an antenna to transmit a communication signal). The second communication circuit 313b may use at least one of Bluetooth®, Bluetooth® low energy (BLE), Wi-Fi, or near field communication (NFC) to receive information on the charge state of the power reception device 320 (e.g., a rectified voltage (Vrec), a current flowing through a rectifying circuit (Iout), various packets, or messages) from the second communication circuit 323b of the power reception device 320.

The sensing circuit 314 may include at least one sensor, and may use the at least one sensor to detect at least one state of the power transmission device 310. For example, the sensing circuit 314 may include a temperature sensor, a motion sensor, a proximity sensor, and/or a current (or voltage) sensor.

The temperature sensor may sense a temperature-related state of the power transmission device 310. The motion sensor may sense a motion-related state of the power transmission device 310. The proximity sensor may detect a specific object (e.g., the power reception device 320 or another metallic object) in proximity and/or contact with the power transmission device 310. The current (or voltage) sensor may sense a state of the output signal (e.g., magnitude of at least one of current, voltage, or power) of the power transmission device 310. The current (or voltage) sensor may measure a signal of the power transmitter 311. For example, the current (or voltage) sensor may measure a signal of at least a portion of the matching circuit 311c and the power generation circuit 311b. The current (or voltage) sensor may include a circuit that measures a signal of the front end of the power transmission coil 311k.

The sensing circuit 314 may detect the power reception device 320 or a foreign object (e.g., metal) placed on or near to the power transmission device 310.

The power transmission device 310 may include a display, which may be used to output various information related to wireless charging (e.g., information regarding the charging state of the power transmission device 310, the charging state of the power reception device 320, detection of the power reception device 320, or detection of a foreign object).

When the power reception device 320 is placed on or near the power transmission device 310, it may wirelessly receive power from the power transmission device 310.

The power reception device 320 includes a power receiver 321, a control circuit 322, a communication circuit 323, at least one sensor 324, and a display.

The power receiver 321 includes a power reception coil 321k for wirelessly receiving power from the power transmission device 310 (e.g., from the power transmission coil 311k), a matching circuit 321a, a rectifying circuit 321b for rectifying received alternating current (AC) power into direct current (DC) power, an adjustment circuit 321c for adjusting the charging voltage, a switching circuit 321d, and a battery 321e.

The control circuit 322 may control the overall operation of the power reception device 320 for wireless power reception (or wireless charging). The control circuit 322 may generate various messages related to wireless charging and transmit them to the communication circuit 323.

The communication circuit 323 includes a first communication circuit 323a and a second communication circuit 323b. The first communication circuit 323a may use the power receiving coil 321k to communicate with the first communication circuit 313a of the power transmission device 310. The second communication circuit 323b may use at least one of Bluetooth®, BLE, Wi-Fi, or NFC to communicate with the second communication circuit 313b of the power transmission device 310.

The sensor 324 may include at least one of a current (or voltage) sensor, a temperature sensor, a proximity sensor, an illuminance sensor, and/or an acceleration sensor. The sensor 324 may sense a current and/or a voltage (e.g., information on the voltage (Vrec) rectified in the rectifying circuit 321b or information on the current (Iout) flowing through the rectifying circuit 321b) flowing in a circuit path of the power receiver 321.

A display may be used to display various types of information related to wireless power reception (or wireless charging).

When the power transmission device 310 is the same or a similar electronic device (e.g., smartphone) as the power reception device 320, the power transmission device 310 may include the same components as power reception device 320.

Figure 3C:
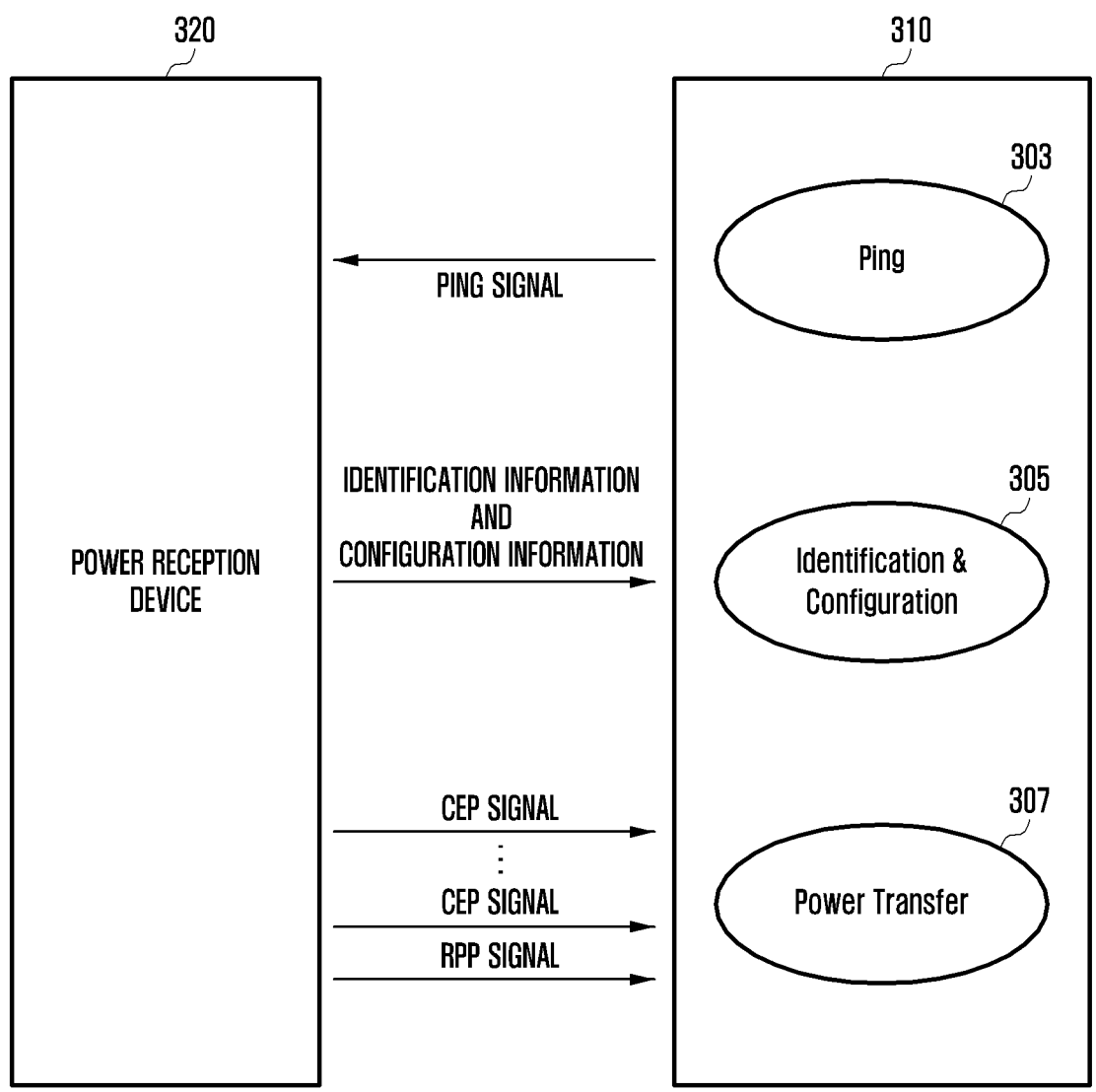
FIG. 3C illustrates a power transmission device detecting a power reception device according to an embodiment.

FIG. 3C illustrates a power transmission device detecting a power reception device according to an embodiment.

Referring to FIG. 3C, the power transmission device 310 may wirelessly transmit power (e.g., perform a transmission (Tx) function) to the power reception device 320.

For example, when the power reception device 320 is placed on or near the power transmission device 310, the power transmission device 310 may detect and authenticate the power reception device 320 and wirelessly transmit power to the power reception device 320.

The power transmission device 310 performs ping operation 303, an identification and configuration operation 305, and a power transfer operation 307. The power transmission device 310 may utilize the ping operation 303, the identification and configuration operation 305, and the power transfer operation 307 to transmit and receive signals and/or data.

More specifically, a control circuit of the power transmission device 310 may use the ping operation 303 to transmit a ping signal for detecting the power reception device 320 within a preset range at preset time intervals. The control circuit of the power transmission device 310 may transmit a first ping signal or a second ping signal to the power reception device 320. The transmission period of the first ping signal may be shorter than that of the second ping signal. The first ping signal may have a transmission period of about 0.1 to 10 ms. The second ping signal may have a transmission period of about 65 to 70 ms. The first ping signal may include an analog ping signal or a Q ping signal. The second ping signal may include a digital ping signal. The transmission period of the first ping signal and the transmission period of the second ping signal are illustrative, and may be changed according to settings of the power transmission device 310 and/or the user.

The power transmission device 310 may receive a feedback signal (e.g., a response signal, identification information, configuration information, and/or an SSP signal) from the power reception device 320 in response to the first ping signal or the second ping signal, and may detect whether the power reception device 320 is present.

The power transmission device 310 may use an analog ping signal as the first ping signal to check whether a specific object (e.g., the power reception device 320 or another metallic object) is placed on or near the power transmission device 310. The power transmission device 310 may detect, for example, a change in current at a power generation circuit, which may vary according to the type and location of the object.

The power transmission device 310 may also use a Q ping signal as the first ping signal to check whether the specific object is placed on or near the power transmission device 310. The power transmission device 310 may detect, for example, changes in attenuation coefficient (e.g., a Q value)

and natural frequency at a power transmission coil, which may vary according to the type and location of the object.

Upon determining that an object is placed on or near the power transmission device 310 using the first ping signal, the power transmission device 310 may check the type and location of the object by using a digital ping signal as the second ping signal. For example, when the power transmission device 310 transmits a digital ping signal as the second ping signal to the power reception device 320, a voltage higher than a given value may be induced across a rectifying circuit of the power reception device 320, and an SSP signal indicating the magnitude of the induced voltage (e.g., information on the voltage value) may be transmitted to the power transmission device 310. The power transmission device 310 may identify the type and location of the power reception device 320 placed on or near the power transmission device 310 based on the received SSP signal.

The power transmission device 310 may receive a packet (e.g., a control error packet (CEP)) related to wireless charging power control from the power reception device 320. The power transmission coil of the power transmission device 310 may include a plurality of coils, and may receive a packet using at least one coil among the plurality of coils. Power transmission device 310 may determine the location of the power reception device 320 based on the received packet and select at least one coil for wireless power transmission.

A control circuit of the power transmission device 310 may configure a plurality of parameters related to transmission of the first ping signal or the second ping signal at the ping operation 303. For example, the control circuit of the power transmission device 310 may configure a plurality of parameters related to the frequency of the first ping signal or the second ping signal, the voltage applied to the power transmission circuit to transmit the first ping signal or the second ping signal, the transmission period of the first ping signal or the second ping signal, etc. The plurality of parameters may be configured by the manufacturer of the power transmission device 310 and be given as default values at the initial configuration of the power transmission device 310.

The control circuit of the power transmission device 310 may determine whether a specific object is present on or near the power transmission device 310 using the ping operation 303. The control circuit of the power transmission device 310 may transmit the ping signal based on the plurality of parameters related to transmission of the first ping signal or the second ping signal during an interval for the ping operation 303 (e.g., a wireless charging standby state), and may check the electrical energy (e.g., at least one of current or voltage) measured at a power transmitter of the power transmission device 310 (or the power transmission coil thereof) in response to the transmission of the ping signal.

The control circuit of the power transmission device 310 may check the relationship between the voltage measured across the power transmitter (or the power transmission coil) and a specified threshold voltage, or the relationship between the current measured at the power transmitter (or the power transmission coil) and a specified threshold current in response to the transmission of the first ping signal or the second ping signal. The control circuit of the power transmission device 310 may then determine whether a specific object is present on or near the power transmission device 310 based on the result of the check.

The control circuit of the power transmission device 310 may sense a state of an object present on the power transmission device 310 (e.g., type, size or arrangement of the object) or change in the state of the object based on change in electrical energy (e.g., at least one of current or voltage) measured at the power transmitter (or the power transmission coil) in response to the transmission of the first ping signal or the second ping signal.

Upon determining that a specific object is placed on or near the power transmission device 310 the control circuit of the power transmission device 310 may change or adjust at least some of the plurality of parameters related to transmission of the first ping signal or the second ping signal in order to suppress noise caused by the object (e.g., vibration of the object and/or noise in the audible frequency band due to the vibration), heat generation of the object, or deterioration of the power transmission device 310 caused by the object (e.g., heat generation of the power transmission device 310 due to induction heating from the object). The control circuit of the power transmission device 310 may output a specified notification (e.g., light, a vibration, or a sound) to provide a notification regarding the presence of the specific object.

Upon detecting the power reception device 320, at the identification and configuration operation 305, the control circuit of the power transmission device 310 may receive identification information and configuration information of the power reception device 320.

The identification information may include at least one piece of information capable of identifying the power reception device 320 (e.g., wireless communication identifier (ID) of the power reception device 320). If the identification information matches information previously stored in a memory (e.g., a wireless communication ID of the power reception device 320 allowed to wirelessly share power with the power transmission device 310), the control circuit of the power transmission device 310 may determine the detected power reception device 320 to be a valid device. The configuration information may include various types of information for the power reception device 320 to wirelessly receive power from the power transmission device 310.

When the power reception device 320 is identified or selected based on the identification information and configuration information, at the power transfer operation 307, the control circuit of the power transmission device 310 may wirelessly transmit power to the power reception device 320.

At the power transfer operation 307, the control circuit of the power transmission device 310 may receive, from the power reception device 320, a CEP signal including notification information on the power (or the amount of power) required by the power reception device 320 for charging or a received power packet (RPP) signal including magnitude information on the power (or the amount of power) received by the power reception device 320. The control circuit of the power transmission device 310 may adjust the power transmitted wirelessly to the power reception device 320 based on the CEP signal and/or the RPP signal.

The power reception device 320 may transmit at least one CEP signal and/or RPP signal at specified periods or when a specific event occurs (e.g., a state change of the power reception device 320). Alternatively, the CEP signal and the RRP signal may be transmitted at different periods.

When the power transmission device 310 includes a plurality of coils, the power transmission device 310 may perform the ping operation 303, the identification and configuration operation 305, and the power transfer operation 307 through two or more coils among the plurality of coils.

The power transmission device 310 may simultaneously perform the ping operation 303 through a plurality of coils or perform the ping operation 303 on a plurality of coils based on a specified pattern or order. When the power reception device 320 is detected through a plurality of coils, the power transmission device 310 may perform the identification and configuration operation 305 through a coil that has detected the power reception device 320 or perform the identification and configuration operation 305 through a coil detected to be greater than or equal to a specified threshold value.

The power transmission device 310 may transmit power to the power reception device 320 through each of the plurality of coils in the power transfer operation 307, and receive feedback from the power reception device 320. Alternatively, the power transmission device 310 may transmit power to the power reception device 320 through two or more of the plurality of coils in the power transfer operation 307, and receive feedback from the power reception device 320.

Figure 4:
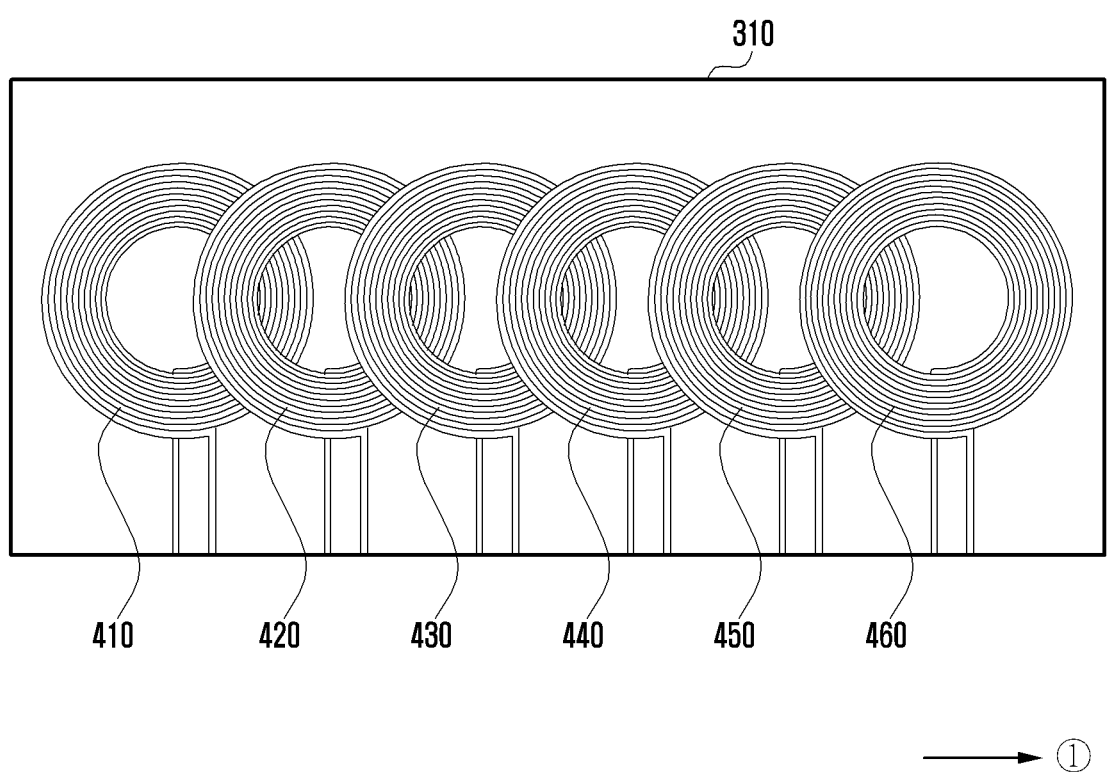
FIG. 4 illustrates an arrangement of coils within a power transmission device according to an embodiment.

FIG. 4 illustrates an arrangement of coils within a power transmission device according to an embodiment.

Referring to FIG. 4, the power transmission device 310 includes a plurality of coils, e.g., a first coil 410, a second coil 420, a third coil 430, a fourth coil 440, a fifth coil 450, and a sixth coil 460.

Although the plurality of coils 410 to 460 are arranged in a plurality of columns in one direction (e.g., direction ①), the disclosure is not limited thereto.

Additionally, although the plurality of coils 410 to 460 are arranged to overlap in FIG. 4, the disclosure is not limited thereto. For example, the plurality of coils 410 to 460 may be arranged a non-overlapping fashion (e.g., spaced apart from each other at predetermined intervals).

Each of the plurality of coils 410 to 460 may have the same shape, but the disclosure is not limited thereto. That is, at least some of the plurality of coils (410 to 460 may have different shapes. For example, some of the number of turns of a coil, a shape of the coil, a size of the coil (e.g., an inside diameter or an outside diameter), and/or a thickness of the coil may be different from another coil.

Figure 5:
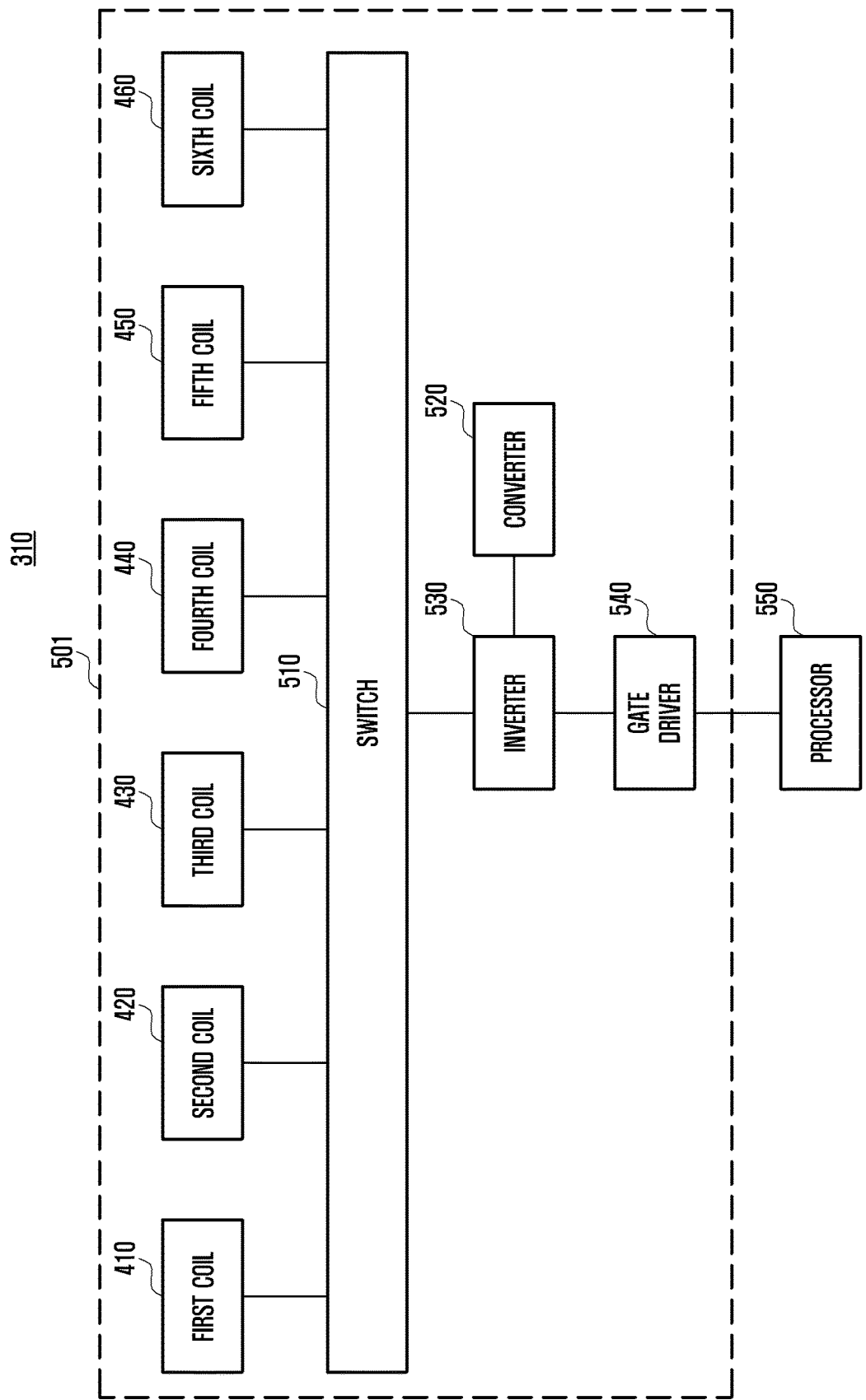
FIG. 5 illustrates a power transmission device according to an embodiment.

FIG. 5 illustrates a power transmission device according to an embodiment.

Referring to FIG. 5, the power transmission device 310 includes a power transmitter 501 and a processor 550. The power transmitter 501 includes power transmission coils 410 to 460, a switch 510, a converter 520, an inverter 530, and a gate driver 540. Alternatively, the power transmitter 501 may also include a matching circuit, a communication circuit, and/or a sensing circuit.

The converter 520 may provide operation power of the inverter 530. For example, the converter 520 may convert power input through a power supply into preset power (e.g., DC power). For example, the converter 520 may convert an output voltage into a voltage of about 5 V.

The inverter 530 may be electrically connected to the converter 520 and may convert a DC voltage output through the converter 520 into an AC voltage. The inverter 530 may further include an amplifier.

The switch 510 may be electrically connected to the inverter 530 and may configure contacts between the inverter 530 and the plurality of coils (410 to 460. The switch 510 may connect the inverter 530 with at least one of the plurality of coils 410 to 460 according to the control of the processor 550.

The plurality of coils 410 to 460 may be connected to the inverter 530 through the switch 510. For example, at least one of the plurality of coils 410 to 460 may be selectively connected to the inverter 530 according to the control of the processor 550 and on or off operations of the switch 510. At least one of the plurality of coils 410 to 460 may configure an electromagnetic field using an AC signal transmitted through the inverter 530 according to the control of the processor 550 and wirelessly transmit power to the power reception device 320.

A resonant element may be provided between the plurality of coils and the inverter 530. The resonant element may include a capacitor, and may improve efficiency of the plurality of coils 410 to 460.

The gate driver 540 may apply a driving signal to a gate of a transistor included in the inverter 530 using the input signal. For example, the driving signal may be in a pulse form that is a pulse width modulated (PWMed).

The inverter 530 may apply AC power to at least one of the plurality of coils 410 to 460 using a driving voltage (or a bridge voltage) from the converter 520 and a driving signal input from a gate driver 540.

The processor 550 may perform at least one operation for detecting a power reception device, identifying information from the power reception device, and providing power to the power reception device. The processor 550 may include a controller that performs at least some of the above-described operations. For example, the processor 550 may be implemented as a dedicated controller for wireless charging, or the processor 550 and a main processor (e.g., a micro controlling unit (MCU)) for managing the overall operation of the power transmission device 310 may be implemented as one unit. As another example, the processor 550 may include a main processor.

The processor 550 may wirelessly transmit power to the power reception device (through at least one of the plurality of coils 410 to 460. The processor 550 may identify a predetermined condition indicating a state in which a coil to transmit power related to charging of the power reception device is to be reconfigured (e.g., a state in which the power reception device is not aligned on the power transmission device 310). For example, the predetermined condition may include a first condition indicating whether a power value required for charging received from the power reception device is larger than a predetermined charging power value, a second condition indicating whether a voltage value input into the inverter 530 is larger than a predetermined voltage value or whether a current value input into the inverter 530 is larger than a predetermined current value, a third condition indicating whether a power value received by the power reception device is less than or equal to a predetermined reception power value, a fourth condition for identifying whether an amount of received power compared to an amount of output power is smaller than predetermined efficiency, and/or a fifth condition indicating whether a state in which at least one of the first to fourth conditions is satisfied is then maintained for a predetermined time.

Upon identifying a state in which at least one of the coils 410 to 460 to transmit power related to charging of the power reception device is to be reconfigured based on a predetermined condition indicating that the power reception device is not aligned on the power transmission device 310, the processor 550 may transmit a CSP to the power reception device 320. The processor 550 may identify an SSP of at least one other coil, which is adjacent to at least one coil wirelessly transmitting power. The processor 550 may wirelessly transmit power to the power reception device 320 through a coil having the largest SSP among SSP of at least one coil which is wirelessly transmitting power and SSP of at least one other coil.

Although FIG. 4 illustrates six coils, i.e., the first coil 410, the second coil 420, the third coil 430, the fourth coil 440, the fifth coil 450, and the sixth coil 460, electrically connected to one switch 510, one converter 520, one inverter 530, and one gate driver 540, the disclosure is not limited thereto. For example, the power transmission device 310 may include multiple switches, inverters, converters, and gate drivers, which may be electrically connected to each coil.

Figure 6A:
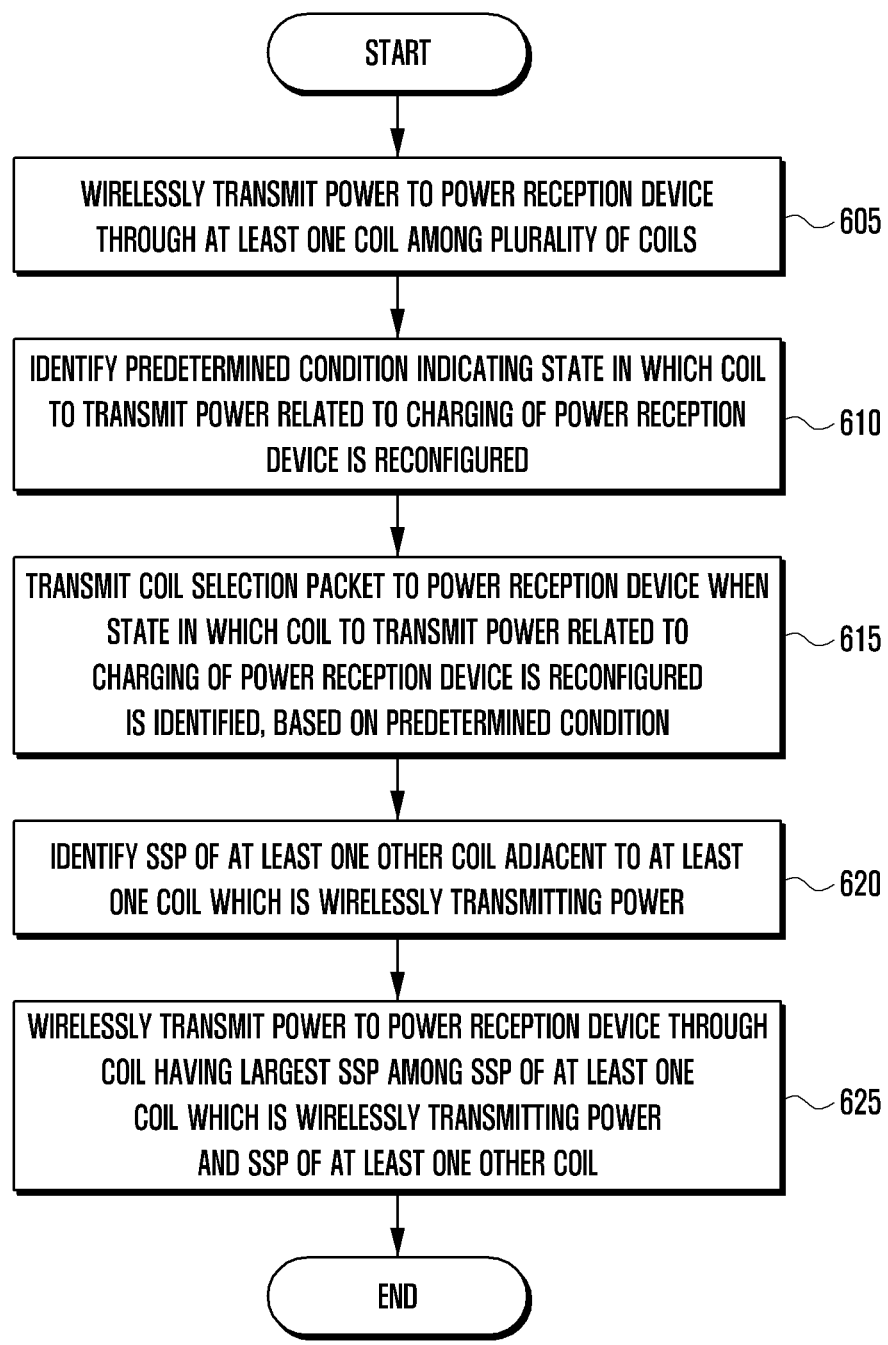
FIG. 6A is a flowchart illustrating a method of performing wireless charging by a power transmission device according to an embodiment.

FIG. 6A is a flowchart illustrating a method of wireless charging by a power transmission device according to an embodiment.

Referring to FIG. 6A, in step 605, a power transmission device wirelessly transmits power to a power reception device through at least one of a plurality of coils.

The power transmission device may select the at least one of the plurality of coils, e.g., by sequentially apply ping signals to the plurality of coils based on a predetermined order or pattern, and then selecting the at least one coil based on at least one of the existence or non-existence of a response to the ping signal, an SSP identified based on a demodulation result, or a change in a voltage or current of the at least one coil.

The power transmission device may perform control to apply power to the at least one selected coil. The power transmission device may identify information from the power reception device based on the voltage and/or current applied to at least one selected coil. For example, the power transmission device may demodulate signals of at least one selected coil, e.g., the voltage and/or current applied to at least one coil. The power transmission device may identify information from the power reception device (e.g., at least one of a device ID or an SSP) based on the demodulation result.

The power transmission device may perform control power transmission based on a signal received from the power reception device based on the demodulation result. For example, the power transmission device may increase or decrease transmission power or stop transmitting power based on the demodulation result.

In step 610, the power transmission device identifies a predetermined condition indicating a state in which a coil to transmit power related to charging of the power reception device is to be reconfigured.

The state in which the coil to transmit power related to charging of the power reception device is to be reconfigured may include a state in which the power reception device is not aligned on the power transmission device.

The predetermined condition may include a first condition indicating whether a power value required for charging received from the power reception device is larger than a predetermined charging power value, a second condition indicating whether a voltage value input into the inverter is larger than a predetermined voltage value or whether a current value input into the inverter is larger than a predetermined current value, a third condition indicating whether a power value received by the power reception device is less than or equal to a predetermined reception power value, or a fourth condition for identifying whether an amount of received power compared to an amount of output power is smaller than predetermined efficiency. The predetermined condition may also include a fifth condition indicating whether a state that satisfies at least one of the first to fourth conditions is maintained for a predetermined time.

The power transmission device may detect a motion of the power reception device arranged on or near the power transmission device. When the motion of the power reception device is detected, the power transmission device may perform step 610, i.e., identify the predetermined condition indicating the state in which the coil to transmit power related to charging of the power reception device is to be reconfigured.

In step 615, when the state in which the coil to transmit power related to charging of the power reception device is to be reconfigured is identified based on the predetermined condition, the power transmission device transmits a CSP to the power reception device.

The CSP may include information indicating a change in at least one coil for wirelessly transmitting power to the power reception device.

The power reception device may transmit a response signal to the power transmission device based on reception of the CSP from the power transmission device.

In step 620, the power transmission device identifies an SSP of at least one other coil, which is adjacent to at least one coil that is wirelessly transmitting power.

The power transmission device may transmit ping signals of at least one other coil adjacent to at least one coil to the power reception device based on reception of the response signal from the power reception device. For example, the power transmission device may transmit the ping signals of at least one other coil adjacent to at least one coil at a predetermined time interval. A time interval at which the ping signals of at least one other coil are transmitted may be shortened. Accordingly, determining (or selecting) a coil having the largest SSP in step 625 below may be performed earlier.

The power reception device may transmit information (e.g., an SSP) related to the size of the received power of at least one other coil in response to the ping signals of at least one other coil received from the power transmission device.

The ping signals of at least one other coil may include a signal for temporarily applying power while power is wirelessly transmitted through at least one coil.

In step 625, the power transmission device may wirelessly transmit power to the power reception device through a coil having the largest SSP among SSP of at least one coil that is wirelessly transmitting power and the SSP of at least one other coil. For example, the power transmission device may select the coil having the largest SSP among the SSP of at least one coil that is wirelessly transmitting power and the SSP of at least one other coil based on information related to a size of the received power of the at least one other coil, e.g., the SSP.

Upon identifying the state in which the coil to transmit power related to charging of the power reception device is to be reconfigured, the power transmission device may change a transmission coil to a coil having a largest SSP based on the SSP of at least one other received coil, in response to ping signals transmitted to the power reception device through at least one other coil adjacent to at least one coil, thereby preventing a time for charging the power reception device from increasing.

Figure 6B:
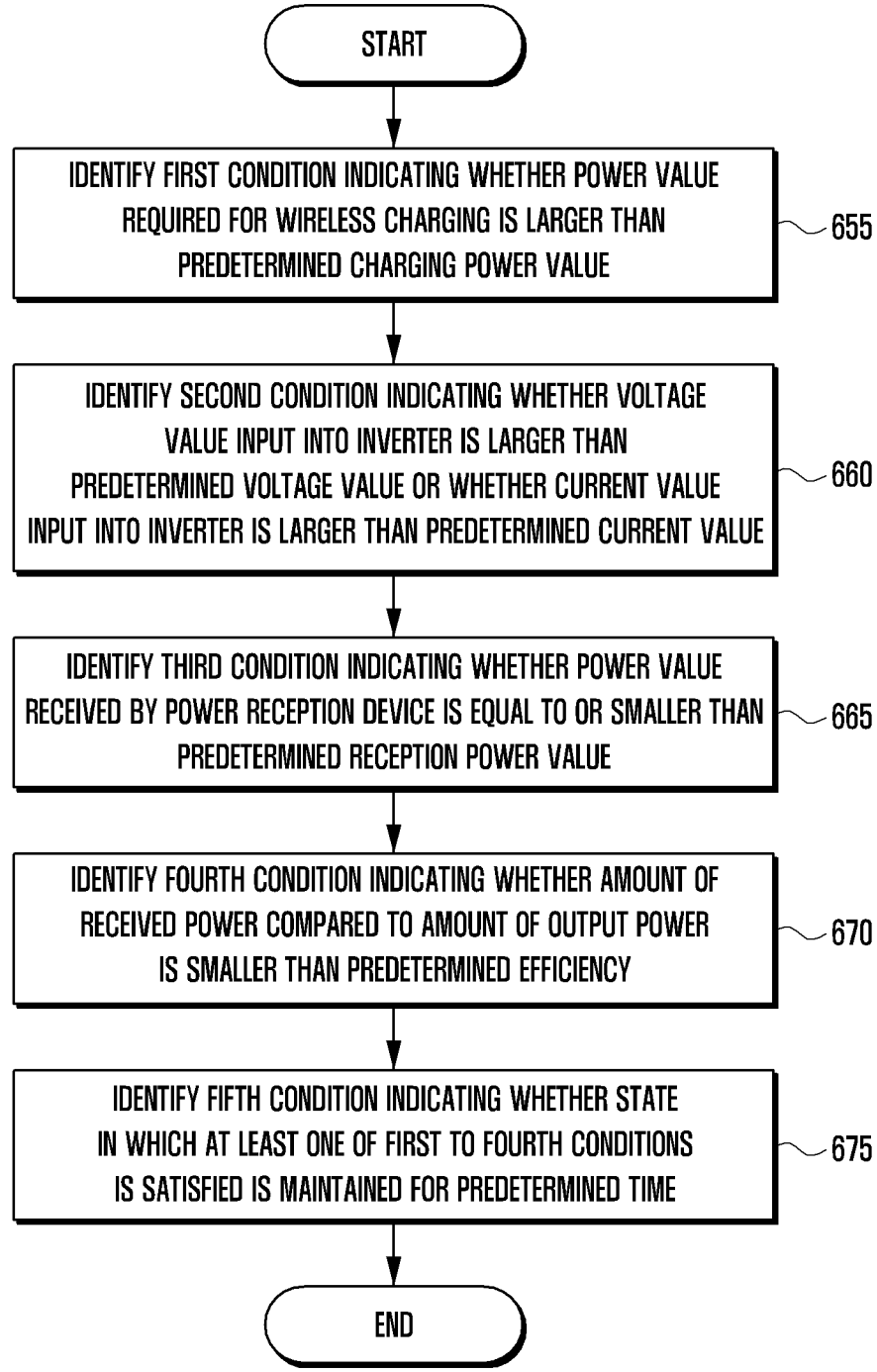
FIG. 6B is a flowchart illustrating a method of identifying a predetermined condition indicating a state in which a coil to transmit power related to charging of a power reception device is to be reconfigured according to an embodiment.

FIG. 6B is a flowchart illustrating a method of identifying a predetermined condition indicating a state in which a coil to transmit power related to charging of a power reception device is to be reconfigured, according to an embodiment.

More specifically, FIG. 6B illustrates a method of identifying a predetermined condition indicating the state in which the coil to transmit power related to charging of the power reception device 320 is to be reconfigured as in step 610 of FIG. 6A.

Referring to FIG. 6B, in step 655, the power transmission device identifies a first condition indicating whether a power value required for wireless charging received from the power reception device is larger than a predetermined charging power value. For example, when the power value required for wireless charging received from the power reception device is larger than the predetermined charging power value, the first condition may be satisfied. The power transmission device may identify the predetermined condition indicating the state in which the coil to transmit power related to charging of the power reception device is to be reconfigured, based on a response signal to at least one coil received from the power reception device. The response signal may include at least one CEP including notification information about power (or an amount of power) required by the power reception device. The power transmission device may identify whether the first condition indicating whether power (or amount of power) required for charging is larger than predetermined charging power (or amount of power) based on the at least one CEP.

In step 660, the power transmission device identifies whether a second condition indicating whether a voltage value input into an inverter thereof is larger than a predetermined voltage value or whether a current value input into the inverter is larger than a predetermined current value is satisfied. For example, when the voltage value input into the inverter is larger than the predetermined voltage value or when the current value input into the inverter is larger than the predetermined current value, the second condition may be satisfied. The power transmission device may also identify whether the second condition indicating whether an inverter bridge voltage (inverter Vbridge) output through a converter is larger than a predetermined voltage value (e.g., 12 V) is satisfied.

In step 665, the power transmission device identifies whether a third condition indicating whether a power value received by the power reception device is less than or equal to a predetermined reception power value is satisfied. For example, when the power value received by the power reception device is less than equal to the predetermined reception power value, the third condition may be satisfied. The power transmission device 310 may identify the predetermined condition indicating the state in which the coil to transmit power related to charging of the power reception device is to be reconfigured based on a response signal to at least one coil received from the power reception device. The response signal may include an RPP signal including information on the magnitude of power (or amount of power) received by the power reception device. The power transmission device may also identify the third condition indicating whether the power value received by the power reception device is less than or equal to the predetermined reception power value (e.g., 7500 mW).

In step 670, the power transmission device identifies whether a fourth condition indicating whether an amount of received power compared to an amount of output power is smaller than predetermined efficiency is satisfied. For example, when the amount of received power of the power reception device, when compared to the amount of output power, is smaller than a predetermined efficiency, the fourth condition may be satisfied.

In step 675, the power transmission device identifies whether a state that satisfies at least one of the first to fourth conditions in steps 655 to 670 is maintained for a predetermined time.

Upon identifying at least one of the first condition in step 655, the second condition in step 660, the third condition in step 665, the fourth condition in step 670, or the fifth condition in step 675, the second the power transmission device may identify that a state in which the coil to transmit power related to charging of the power reception device is to be reconfigured and then transmit a CSP to the power reception device, as in step 615 of FIG. 6A.

Although not illustrated, when none of the first to fifth conditions is satisfied, the power transmission device may not identify the state in which the coil to transmit power related to charging of the power reception device is to be reconfigured. In this case, the power transmission device may continue to wirelessly transmitting power to the power reception device through at least one coil, as in step 605 of FIG. 6A. As another example, the power transmission device may stop the operation for wirelessly transmitting power to the power reception device through at least one coil.

Although the state in which the coil to transmit power related to charging of the power reception device is to be reconfigured is identified in the order of the first to fourth conditions in FIG. 6B, the disclosure is not limited thereto. For example, the order for identifying the first to fourth conditions may be different or may be performed in parallel. As another example, at least one operation of the first to fourth conditions may be omitted.

Figure 7A:
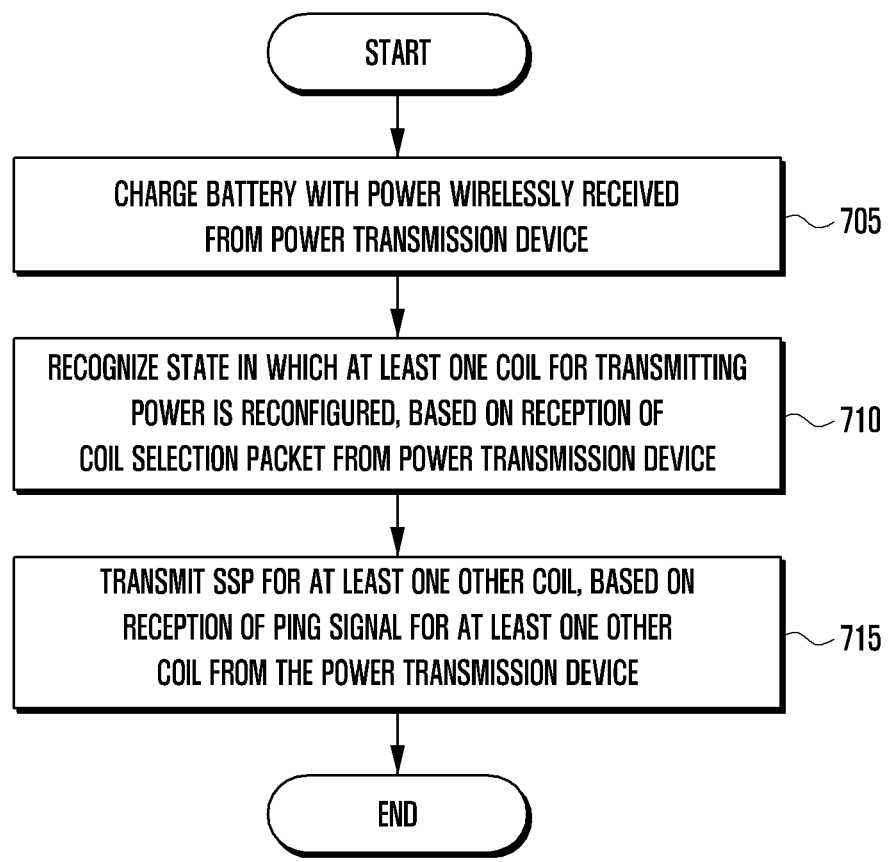
FIG. 7A is a flowchart illustrating a method of performing wireless charging by a power reception device according to an embodiment.

FIG. 7A is a flowchart illustrating a method of wirelessly charging a power reception device according to an embodiment.

Referring to FIG. 7A, in step 705, the power reception device charges a battery with power wirelessly received from the power transmission device.

In step 710, the power reception device recognizes a state in which at least one coil to transmit power is to be reconfigured based on reception of a CSP from the power transmission device.

In step 715, the power reception device transmits an SSP for at least one other coil to the power transmission device based on reception of ping signals for the at least one other coil from the power transmission device.

Thereafter, the power reception device may charge the battery with power received through a coil having the largest SSP selected by the power transmission device, but is not limited thereto. For example, the power reception device may know the reception power for at least one other coil based on reception of a ping signal for the at least one other coil. The power reception device may transmit, to the power transmission device, a signal requesting to select a coil having the largest reception power in order to wirelessly receive power through the coil having the largest reception power.

Figure 7B:
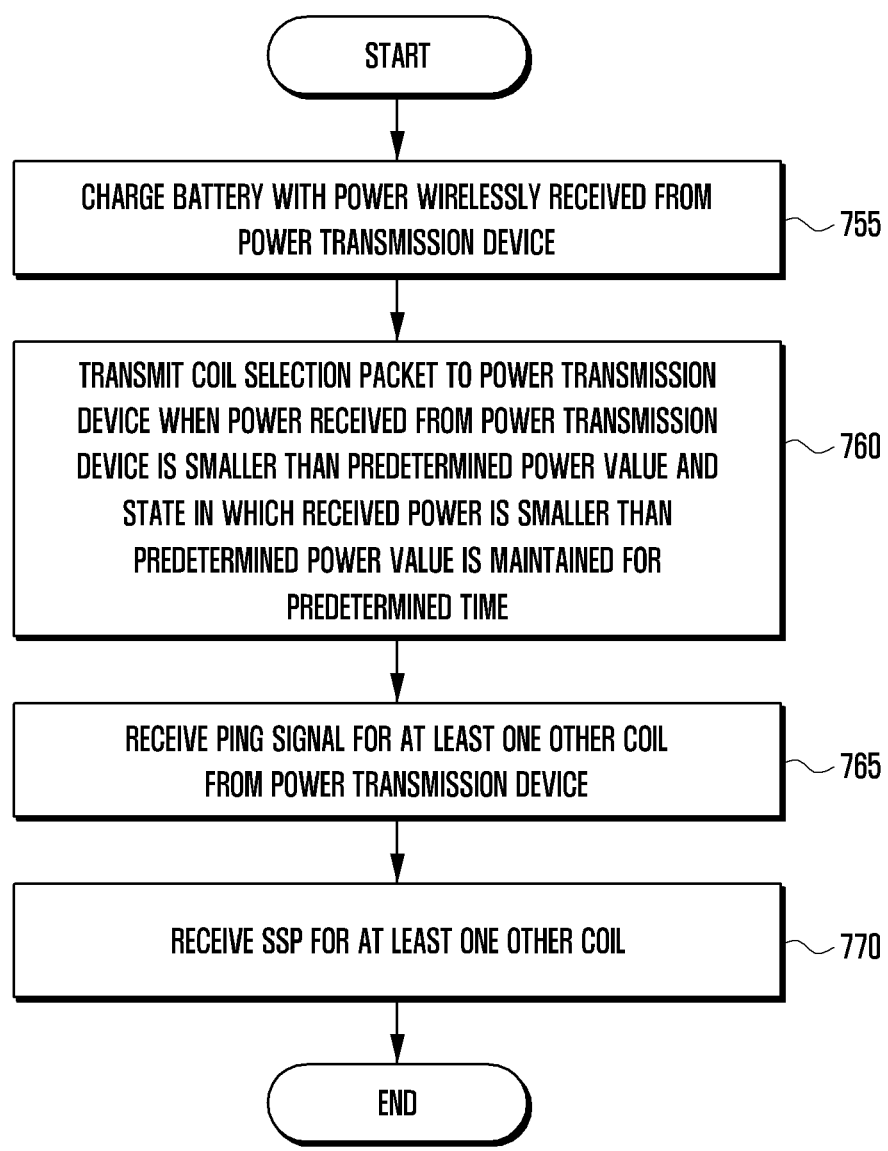
FIG. 7B is a flowchart illustrating a method of performing wireless charging by a power reception device according to an embodiment.

FIG. 7B is a flowchart illustrating a method of wirelessly charging a power reception device according to an embodiment.

Referring to FIG. 7B, in step 755, the power reception device charges a battery with power wirelessly received from the power transmission device.

In step 760, when power received from the power transmission device is smaller than a predetermined power value and the state in which the received power is smaller than the predetermined power value is maintained for a predetermined time, the power reception device transmits a CSP to the power transmission device.

In step 765, the power reception device receives ping signals for at least one other coil from the power transmission device based on transmission of the CSP to the power transmission device.

In step 770, the power reception device transmits an SSP for the at least one other coil to the power transmission device.

Thereafter, the power reception device may charge the battery with power received through a coil having the largest SSP selected by the power transmission device, but is not limited thereto. For example, the power reception device may identify reception power for at least one other coil based on a ping signal for at least one other coil. The power reception device may then transmit, to the power transmission device, a signal requesting to select a coil having the largest reception power in order to wirelessly receive power through the coil having the largest reception power.

Figure 8:
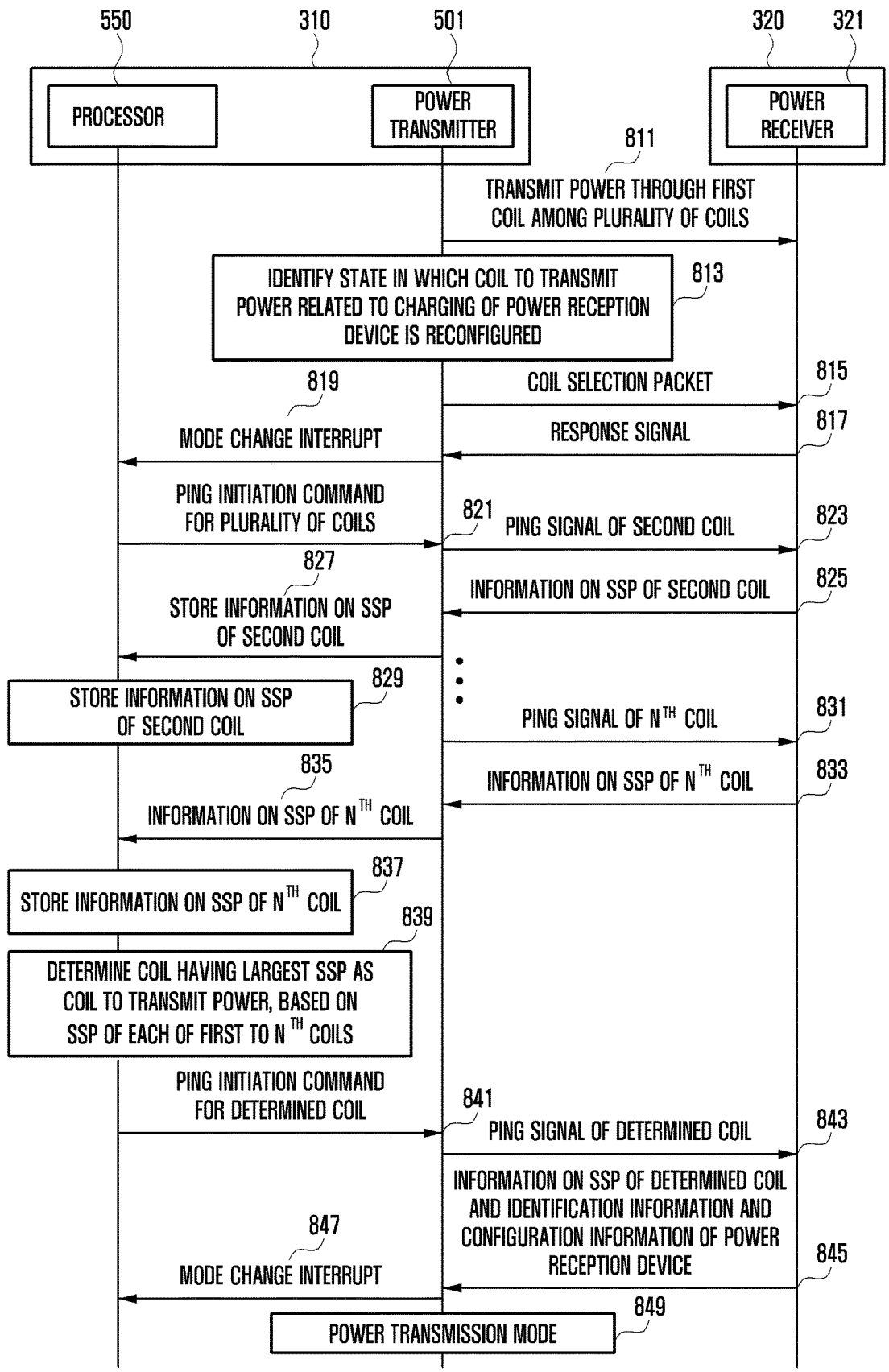
FIG. 8 is a signal flow diagram illustrating operations of a power transmission device and a power reception device according to an embodiment.

FIG. 8 is a signal flow diagram illustrating operations of a power transmission device and a power reception device according to an embodiment.

Referring to FIG. 8, in step 811, a power transmitter 501 of a power transmission device 310 wirelessly transmits power to a power receiver 321 of a power reception device 320 through a first coil among the plurality of coils.

Although the operations in FIG. 8 are described while wirelessly transmitting power to the power reception device 320 using the first coil in step 811, this is only an example to make a description easier, and the disclosure is not limited thereto.

In step 813, the power transmitter 501 of the power transmission device 310 identifies a state in which a coil to transmit power related to charging of the power reception device 320 is to be reconfigured. In step 815, the power transmitter 501 of the power transmission device 310 transmits a CSP to the power receiver 321 of the power reception device 320.

In step 817, the power transmitter 501 of the power transmission device 310 receives a response signal from the power receiver 321 of the power reception device 320 based on the transmitted CSP. For example, the response signal received from the power receiver 321 of the power reception device 320 may include a recognition of the state in which the first coil for transmitting power is to be reconfigured.

The power transmission device 310 may maintain a light emitting diode (LED) indicating a charging state. For example, the power transmission device 310 may maintain a state in which an indicator (e.g., a notification LED) separately provided to the power transmission device 310 emits light based on a light emission characteristic indicating the charging state. The power reception device 320 may also control a display to display information related to charging of a battery and/or maintain a state in which an LED disposed on a surface of the power reception device 320 emits light.

In step 819, the power transmitter 501 of the power transmission device 310 transmits a mode change interrupt to the processor 550 of the power transmission device 310. For example, when preparation for a ping procedure is completed, the power transmitter 501 of the power transmission device 310 may transmit the mode change interrupt to the processor 550.

In step 821 the processor 550 of the power transmission device 310 transfers a ping initiation command (e.g., a command for preparing a ping signal application operation) for a plurality of coils (e.g., at least one other coil, which is adjacent to the first coil that is wirelessly transmitting power) to the power transmitter 501 in response to the mode change interrupt received from the power transmitter 501.

The power transmitter 501 of the power transmission device 310 may control a switch based on the ping initiation command for the plurality of coils received from the processor 550 and perform control to apply ping signals to the plurality of coils sequentially or in a predetermined pattern.

The power transmitter 501 of the power transmission device 310 may operate in a ping signal application operation mode. In step 823, the power transmitter 501 of the power transmission device 310 transmits the ping signal of a second coil to the power receiver 321 of the power reception device 320. In response thereto, in step 825, the power receiver 321 of the power reception device 320 transmits information on the SSP of the second coil to the power transmitter 501 of the power transmission device 310. In step 827, the power transmitter 501 of the power transmission device 310 transmits, to the processor 550, a signal requesting to store information on the SSP of the second coil.

In step 829, the processor 550 of the power transmission device 310 stores information on the SSP of the second coil in response to the received request.

In step 831, the power transmitter 501 of the power transmission device 310 transmits a ping signal of an $n^{th}$ coil to the power receiver 321 of the power reception device 320. In step 833, in response thereto, the power receiver 321 of the power reception device 320 transmits information on an SSP of the $n^{th}$ coil to the power transmitter 501 of the power transmission device 310.

In step 835, the power transmitter 501 of the power transmission device 310 transmits, to the processor 550, a signal requesting to store information on the SSP of the $n^{th}$ coil. In step 837, the processor 550 of the power transmission device 310 stores the information on the SSP of the $n^{th}$ coil in response to the received request.

The number of coils transmitting ping signals may vary depending on SSP of at least one other coil received from the power reception device 320, wherein the coils transmitting the ping signals include at least one coil that is adjacent to the first coil that is wirelessly transmitting power.

In step 839, the processor 550 of the power transmission device 310 may determine (e.g., select) a coil having the largest SSP as a coil to transmit power based on the first to $n^{th}$ coils. In step 841, the processor 550 of the power transmission device 310 transmits a ping initiation command for the determined coil to the power transmitter 501 of the power transmission device 310.

In step 843, the power transmitter 501 of the power transmission device 310 transmits a ping signal of the determined coil to the power receiver 321 of the power reception device 320. In response thereto, in step 845, the power receiver 321 of the power reception device 320 transmits the SSP of the determined coil and identification information and configuration information of the power reception device 320 to the power transmitter 501 of the power transmission device 310.

In step 847, the power transmitter 501 of the power transmission device 310 transmits a mode change interrupt to the processor 550 of the power transmission device 310. For example, when entering a state in which power is wirelessly transmitted through a coil, the power transmitter 501 of the power transmission device 310 may transmit a mode change interrupt to the processor 550.

In step 849, the power transmitter 501 of the power transmission device 310 operates in a power transmission mode. For example, when it is identified that a coil change operation based on the mode change interrupt is completed by the processor 550 of the power transmission device 310, the power transmitter 501 may operate in the power transmission mode. The power transmission mode may include wirelessly transmitting power to the power reception device 320 through the determined coil.

Figure 9:
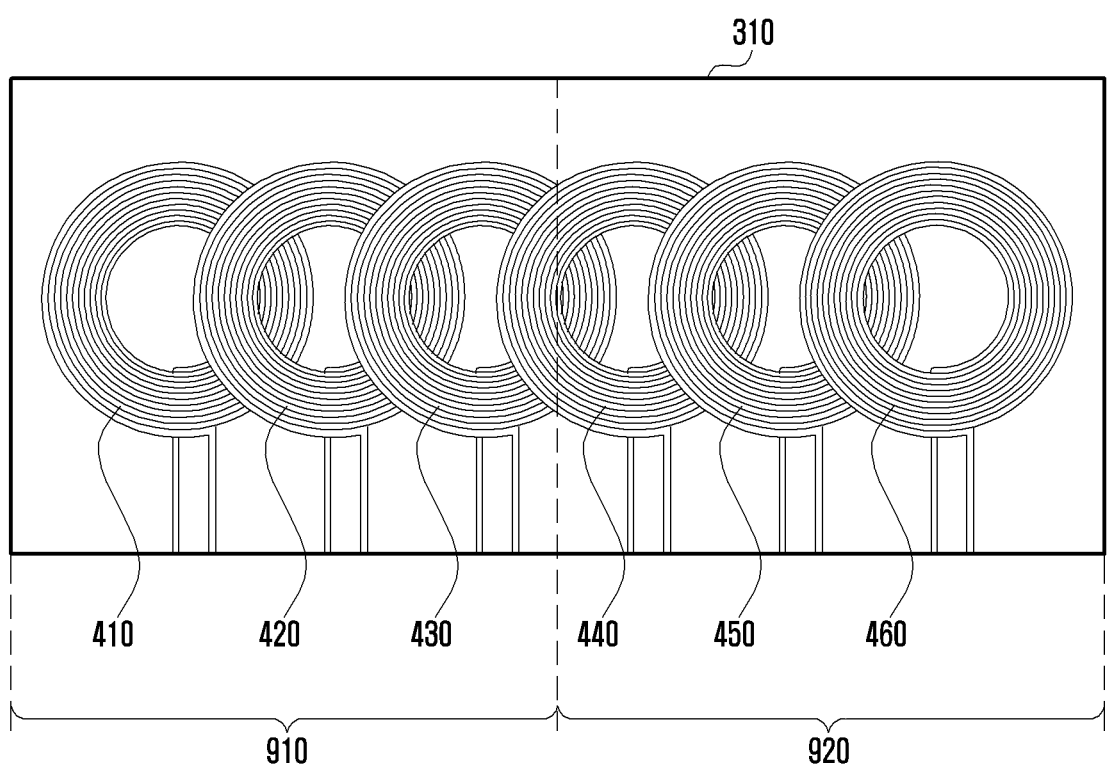
FIG. 9 illustrates an arrangement of coils within a power transmission device according to an embodiment.

FIG. 9 illustrates an arrangement of coils within a power transmission device according to an embodiment.

Referring to FIG. 9, a power transmission device 310 includes a first power transmitter that provides signals (e.g., ping signals or signals for charging) to a first coil 410, a second coil 420, and/or a third coil 430, and a second power transmitter that provides signals to a fourth coil 440, a fifth coil 450, and/or a sixth coil 460. The first power transmitter may also demodulate signals output from the first coil 410, the second coil 420, and/or the third coil 430 and identify information from the power reception device based on the demodulation result. Similarly, the second power transmitter may demodulate signals output from the fourth coil 440, the fifth coil 450, and/or the sixth coil 460 and identify information from the power reception device 320 on the basis of the demodulation result. For example, the first coil 410, the second coil 420, and the third coil 430 may be disposed to cover a first area 910 of the power transmission device 310, and the fourth coil 440, the fifth coil 450, and/or the sixth coil 460 may be disposed to cover a second area 920 of the power transmission device 310.

Although FIG. 9 illustrates the power transmission device 310 having two power transmitters, two areas 910 and 920, and/or six coils 410 to 460, the disclosure is not limited thereto. For example, areas in which the plurality of coils are disposed, the number of power transmitters for controlling the plurality of coils, and the number, location, size, or shape of coils may vary.

Figure 10:
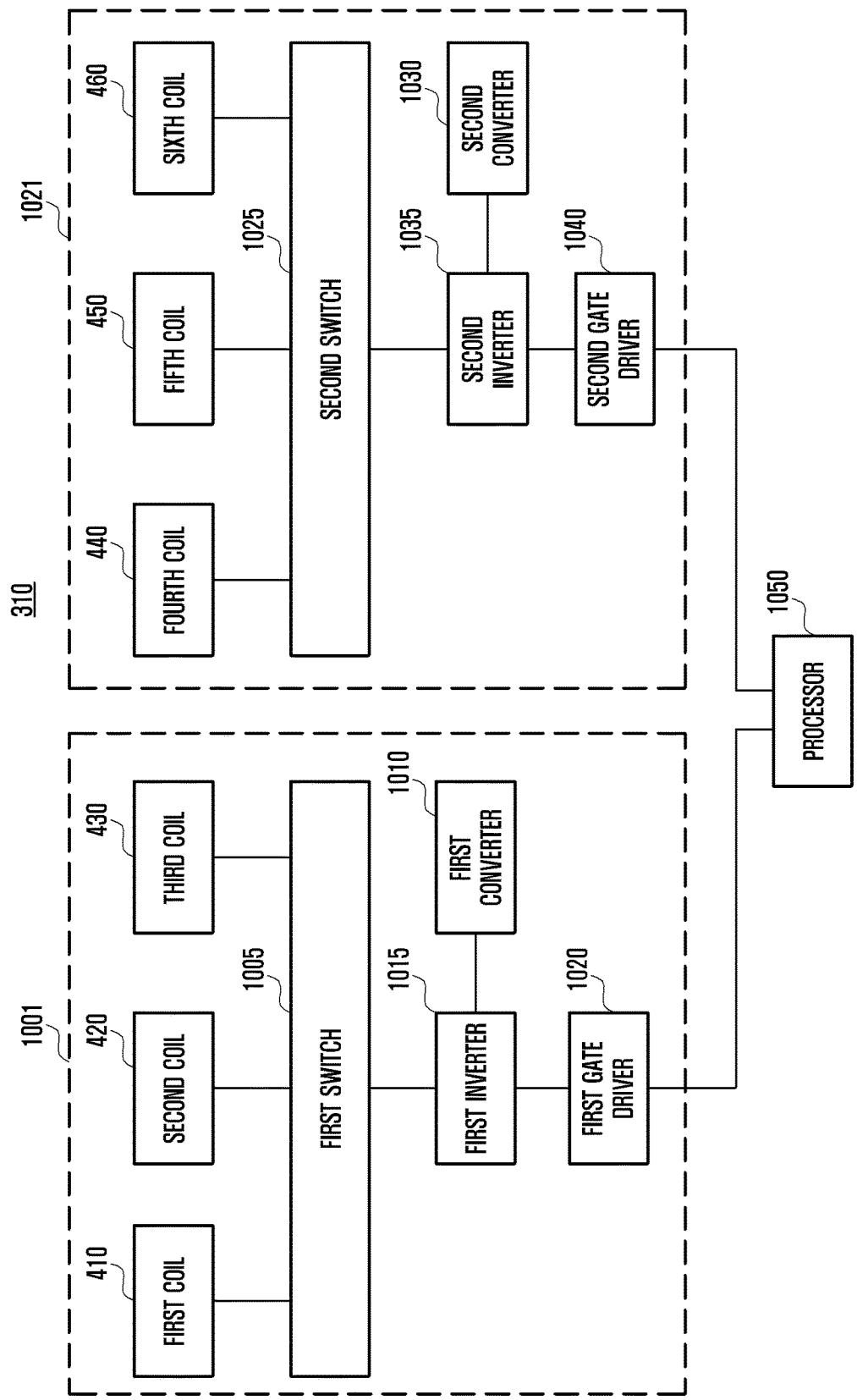
FIG. 10 illustrates a power transmission device according to an embodiment.

FIG. 10 illustrates a power transmission device according to an embodiment.

Referring to FIG. 10, the power transmission device 310 includes a first power transmitter 1001, a second power transmitter 1021, and a processor 1050. The first power transmitter 1001 includes a first coil 410, a second coil 420, a third coil 430, a first switch 1005, a first converter 1010, a first inverter 1015, and a first gate driver 1020. The second power transmitter 1021 includes a fourth coil 440, a fifth coil 450, a sixth coil 460, a second switch 1025, a second converter 1030, a second inverter 1035, and a second gate driver 1040.

The first converter 1010 and the second converter 1030 may convert power input through a power supply into preset power (e.g., DC power). For example, the first converter 1010 and the second converter 1030 may convert an output voltage into about 5 V.

The first inverter 1015 may be electrically connected to the first converter 1010, and the second inverter 1035 may be electrically connected to the second converter 1030. The first inverter 1015 may convert a DC voltage output through the first converter 1010 into an AC voltage. The second inverter 1035 may convert a DC voltage output through the second converter 1030 into an AC voltage. The first inverter 1015 and/or the second inverter 1035 may further include an amplifier.

The first switch 1005 may be electrically connected to the first inverter 1015 and may configure contact between the first inverter 1015 and the first coil 410, the second coil 420, and/or the third coil 430. The first switch 1005 may connect the first inverter 1015 with at least one of the first coil 410, the second coil 420, or the third coil 430 according to the control of the processor 1050.

The second switch 1025 may be electrically connected to the second inverter 1035 and may configure a contact between the second inverter 1035 and the fourth coil 440, the fifth coil 450, and/or the sixth coil 460. The second switch 1025 may connect the second inverter 1035 with at least one of the fourth coil 440, the fifth coil 450, or the sixth coil 460 according to the control of the processor 1050.

The first coil 410, the second coil 420, and/or the third coil 430 may be selectively connected to the first inverter 1015 through the first switch 1005, e.g., according to the control of the processor 1050 and an on or off operation of the first switch 1005. At least one of the first coil 410, the second coil 420, or the third coil 430 may wirelessly transmit power to the power reception device 320 by configuring an electromagnetic field using an AC signal transmitted through the first inverter 1015 according to the control of the processor 1050.

A resonant element may be provided between the first inverter 1015 and the first coil 410, the second coil 420, and/or the third coil 430. The resonant element may include a capacitor and may improve efficiency of the first coil 410, the second coil 420, and/or the third coil 430.

The first gate driver 1020 may apply a driving signal to a gate of a transistor included in the first inverter 1015 by using an input signal. The driving signal may be in a pulse form that is PWMed. The first inverter 1015 may apply AC power to at least one of the first coil 410, the second coil 420, and/or the third coil 430 by using a driving voltage (or bridge voltage) from the first converter 1010 and a driving signal input from the first gate driver 1020.

The fourth coil 440, the fifth coil 450, and/or the sixth coil 460 may be selectively connected to the second inverter 1035 through the second switch 1025, e.g., according to the control of the processor 1050 and an on or off operation of the second switch 1025. At least one of the fourth coil 440, the fifth coil 450, and/or the sixth coil 460 may wirelessly transmit power to the power reception device 320 by configuring an electromagnetic field by using an AC signal transmitted through the second inverter 1035 according to the control of the processor 1050.

A resonant element may be provided between the second inverter 1035 and the fourth coil 440, the fifth coil 450, and/or the sixth coil 460. The resonant element may include a capacitor and may improve efficiency of the fourth coil 440, the fifth coil 450, and/or the sixth coil 460.

The second gate driver 1040 may apply a driving signal to a gate of a transistor included in the second inverter 1035 by using an input signal. The driving signal may be in a pulse form that is PWMed.

The second inverter 1035 may apply AC power to at least one of the fourth coil 440, the fifth coil 450, and/or the sixth coil 460 by using a driving voltage (or bridge voltage) from the second converter 1030 and a driving signal input from the second gate driver 1040.

The processor 1050 may transmit and receive data to and from the first power transmitter 1001 and the second power transmitter 1021. The processor 1050 may receive data from the first power transmitter 1001 and the second power transmitter 1021 and transmit data for controlling the first power transmitter 1001 and the second power transmitter 1021.

As described above, the first power transmitter 1001 may select one of the first coil 410, the second coil 420, or the third coil 430 and apply power (e.g., a ping signal) to the selected coil, and the second power transmitter 1021 may select one of the fourth coil 440, the fifth coil 450, or the sixth coil 460 and apply power (e.g., a ping signal) to the selected coil. The processor 1050 may transmit a control command for outputting ping signals to the first power transmitter 1001 and the second power transmitter 1021, and accordingly perform not to simultaneously apply ping signals to the plurality of coils.

The processor 1050 may wirelessly transmit power to the power reception device 320 through at least one coil among the first coil 410, the second coil 420, or the third coil 430 arranged in a first area of the power transmission device 310, based on an arrangement of a power reception device 320 in the first area. When it is identified that a power reception device is located in a second area of the power transmission device 310, the processor 1050 may wirelessly transmit power to the power reception device through at least one of the fourth coil 440, the fifth coil 450, or the sixth coil 460 arranged in the second area.

The processor 1050 may receive an SSP through at least one of the first coil 410, the second coil 420, or the third coil 430 in the first area for wirelessly transmitting power. Upon identifying a state in which a coil to transmit power related to charging is to be reconfigured based on a predetermined condition indicating the state in which the coil to transmit power related to charging of the power reception device is to be reconfigured, the processor 1050 may transmit a CSP to the power reception device. The processor 1050 may identify the SSP of at least one of the fourth coil 440, the fifth coil 450, or the sixth coil 460, which are arranged in the second area, which is adjacent to at least one coil of the first area which is wirelessly transmitting power. The processor 1050 may wirelessly transmit power to the power reception device through a coil having the largest SSP among the SSP of at least one of the first coil 410, the second coil 420, or the third coil 430 in the first area, which is wirelessly transmitting power, and the SSP of at least one of the fourth coil 440, the fifth coil 450, or the sixth coil 460 in the second area.

FIG. 11 is a flowchart illustrating a method of performing wireless charging by a power transmission device according to an embodiment.

Referring to FIG. 11, in step 1105, a processor of a power transmission device wirelessly transmits power to a power reception device through at least one coil among a plurality of coils arranged in a first area of the power transmission device, based on a disposition of the power reception device in the first area.

The power transmission device may select the at least one coil from among the plurality of coils arranged in the first area of the power transmission device. For example, the power transmission device may sequentially apply ping signals to the plurality of coils, and then, may select the at least one coil from among the plurality of coils based on a response to a ping signal, an SSP identified based on a demodulation result, and/or a change in a voltage or current of the at least one coil. However, the disclosure is not limited thereto. For example, a coil having the largest SSP may be selected from among the plurality of coils.

The power transmission device may perform control to apply power to the at least one selected coil.

The power transmission device may identify information from the power reception device based on the voltage and/or current applied to at least one selected coil. For example, the power transmission device may demodulate signals of the at least one selected coil, e.g., the voltage and/or current applied to the at least one coil.

The power transmission device may identify information from the power reception device based on the demodulation result. For example, the information may include at least one of a device ID or an SSP. However, the disclosure is not limited thereto. The power transmission device may control the power transmission based on a signal received from the power reception device based on the demodulation result.

In step 1110, the power transmission device receives an SSP through the at least one coil in the first area for wirelessly transmitting.

In step 1115, the power transmission device identifies a condition indicating a state in which a coil to transmit power related to charging of the power reception device is to be reconfigured. For example, the state in which the coil to transmit power related to charging of the power reception device is to be reconfigured may include a state in which the power reception device is not aligned with the first area of the power transmission device (e.g., a state in which a coil of the power reception device and a coil of the power transmission device are misaligned).

The condition may include a first condition indicating whether a power value required for charging received from the power reception device is larger than a predetermined charging power value, a second condition indicating whether a voltage value input into an inverter is larger than a predetermined voltage value or whether a current value input into the inverter is larger than a predetermined current value, a third condition indicating whether a power value received by the power reception device is less than or equal to a predetermined reception power value, a fourth condition for identifying whether an amount of received power compared to an amount of output power is smaller than predetermined efficiency, and/or a fifth condition indicating whether a state in which at least one of the first to fourth conditions is satisfied is maintained for a predetermined time, as described above with reference to FIG. 6B.

In step 1120, upon identifying the state in which the coil to transmit power related to charging of the power reception device is to be reconfigured based on the condition, the processor 1050 transmits a CSP to the power reception device. The CSP may include information indicating a change in at least one coil arranged in the first area to wirelessly transmit power to the power reception device.

The power reception device may recognize a state in which at least one coil in the first area is to be reconfigured based on reception of the CSP from the power transmission device.

In step 1125, the processor 1050 identifies an SSP of at least one other coil arranged in a second area, which is adjacent to at least one coil in the first area which is wirelessly transmitting power.

The power transmission device may transmit ping signals of at least one other coil in the second area adjacent to at least one coil in the first area to the power reception device. For example, the power transmission device may sequentially apply signals (e.g., ping signals) to a plurality of coils in the second area by controlling a second power transmitter.

The power transmission device may transmit ping signals of at least one other coil in the first area and/or at least one other coil in the second area adjacent to at least one coil in the first area to the power reception device. For example, signals (e.g., ping signals) may be sequentially applied to a second coil in the first area and/or a fourth coil in the second area adjacent to the third coil.

The power reception device may transmit received information (e.g., an SSP) related to the size of power of the coils in the second to the power transmission device in response to the ping signals of the coils in the second area.

In step 1130, the processor wirelessly transmits power to the power reception device through a coil having the largest SSP among the SSP of at least one coil in the first area and the SSP of at least one other coil in the second area.

Although FIG. 11 describes that the SSP of at least one other coil arranged in the second area, which is adjacent to at least one coil in the first area, is identified in step 1125, the disclosure is not limited thereto. For example, the power transmission device may apply signals (e.g., ping signals) to coils, except for the at least one coil in the first area that is wirelessly transmitting power, and then may receive SSPs for the coils, except for the at least one coil in the first area, from the power reception device 320. In this case, the power transmission device may wirelessly transmit power to the power reception device through a coil having the largest SSP among the SSP of at least one coil in the first area that is wirelessly transmitting power, the SSP of at least one other coil in the first area, and the SSP of at least one other coil in the second area.

Figure 12A:
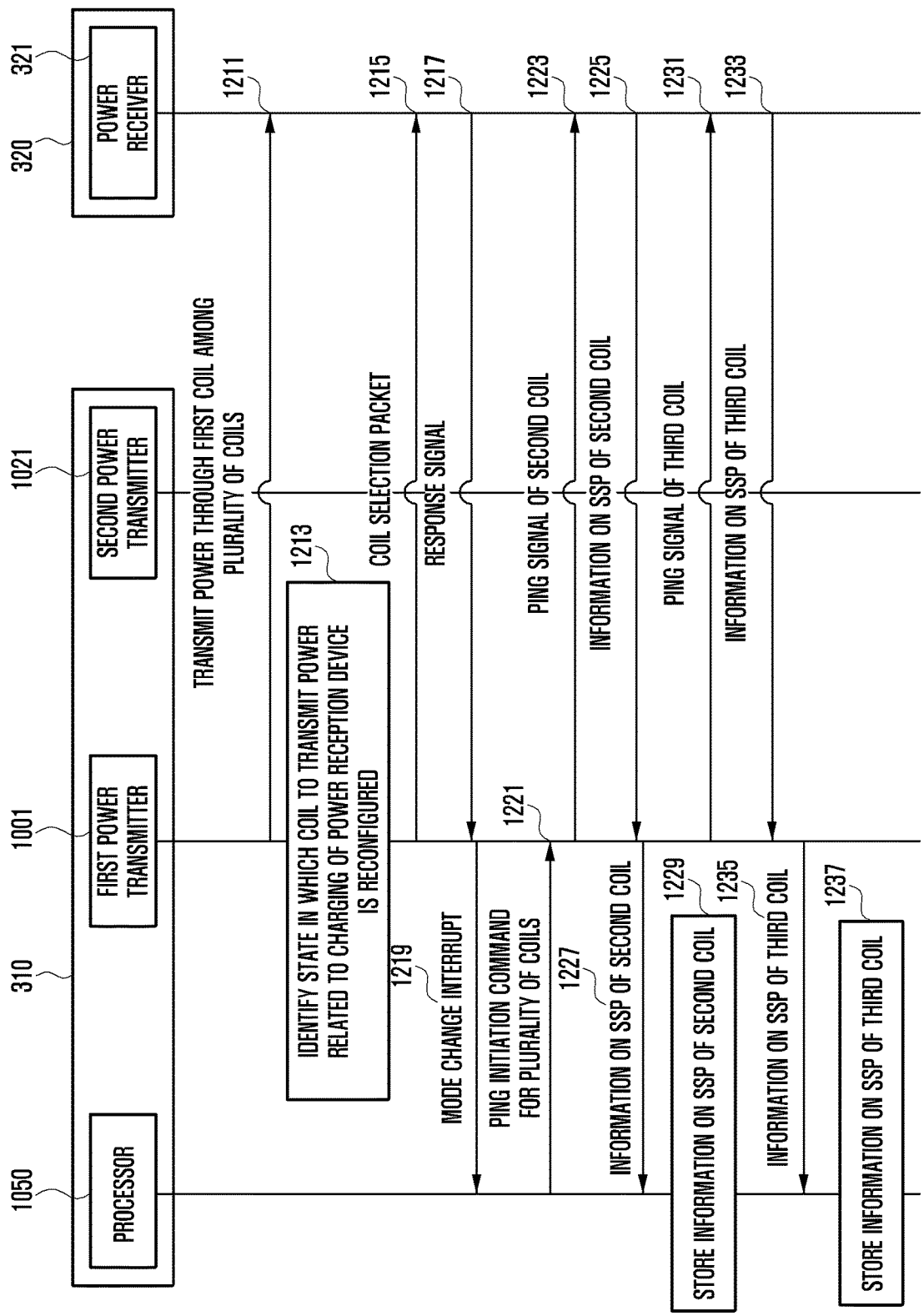
FIGS. 12A and 12B are signal flow diagrams illustrating operations of a power transmission device and a power reception device according to an embodiment.
Figure 12B:
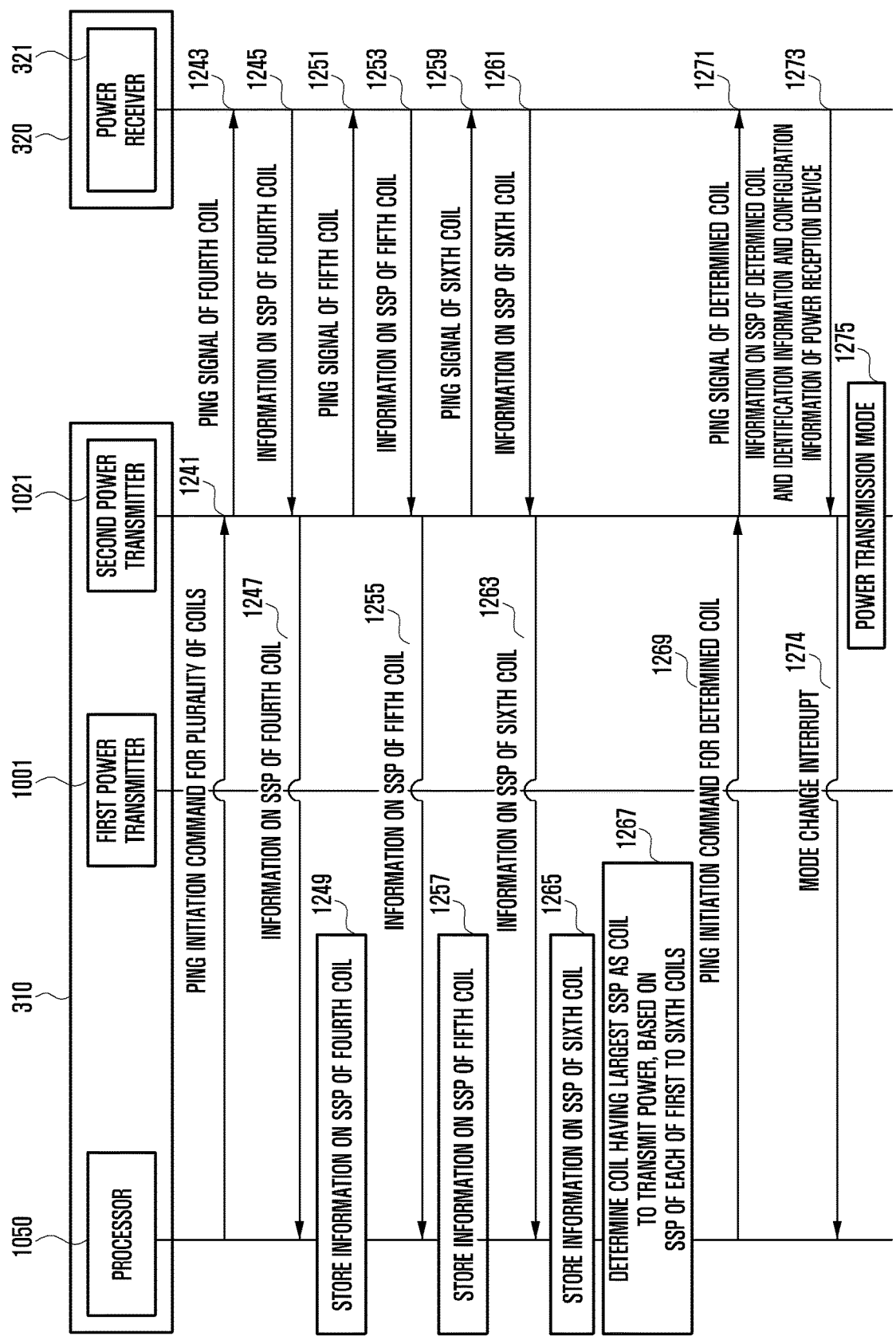

FIGS. 12A and 12B are signal flow diagrams illustrating operations of a power transmission device and a power reception device according to an embodiment.

Referring to FIGS. 12A and 12B, in step 1211, a first power transmitter 1001 of a power transmission device 310 wirelessly transmits power to a power receiver 321 of a power reception device through a first coil among a plurality of coils.

Although FIGS. 12A and 12B will be described using the first coil in step 1211, this is only an example to make a description easier, and the disclosure is not limited thereto.

In step 1213, the first power transmitter 1001 of the power transmission device 310 identifies a state in which a coil to transmit power related to charging of the power reception device 320 is to be reconfigured.

In step 1215, the first power transmitter 1001 of the power transmission device 310 transmits a CSP to the power receiver 321 of the power reception device 320 based on identification of the state in which the coil to transmit power related to charging of the power reception device 320 is to be reconfigured.

In step 1217, the power transmitter 1001 of the power transmission device 310 receives a response signal (e.g., a recognition of the state in which the first coil for transmitting power is to be reconfigured) from the power receiver 321 of the power reception device 320 based on the transmission of the CSP to the power receiver 321 of the power reception device 320.

As described above, an LED may be used by the power transmission device 310 to indicate the charging state. Additionally or alternatively, the power reception device 320 may control a display to display information related to charging of a battery.

When the state in which the first coil for transmitting power is to be reconfigured is recognized, the operation for wirelessly transmitting power through the first coil may be stopped. That is, charging of the power reception device 320 may be stopped.

Although the operation for wirelessly transmitting power through the first coil is stopped, the indication of the charging state may still be displayed (e.g., the state in which the indicator (e.g., LED) separately provided to the power transmission device 310 emits light is maintained, information related to charging of a battery is displayed on a display of the power reception device 320), and/or a state in which the LED disposed on the front surface emits light is maintained). For example, although the operation for wirelessly transmitting power through the first coil is stopped, the operation for displaying the charging state may continue in order to prevent a user from recognizing a state in which charging of the power reception device 320 is stopped.

In another example, when the user recognizes the state in which charging of the power reception device 320 is stopped, the location of the power reception device 320 may be changed in the power transmission device 310 in order to start stopped charging, and thus the operation may be an operation for preventing the same. When the state in which the first coil 410 for transmitting power is reconfigured is recognized, the charging state may be displayed even though the operation for wirelessly transmitting power through the first coil 410 is stopped, and thus the power transmission device 310 may perform an operation for selecting another coil to wirelessly transmit power instead of the first coil 410 even in the state in which the user is not aware of it, thereby increasing charging efficiency, reducing heat of the power transmission device 310 and the power reception device 320, and preventing a time for charging the power reception device 320 from increasing.

In step 1219, the first power transmitter 1001 of the power transmission device 310 transmits a mode change interrupt to the processor 1050 of the power transmission device 310.

In response thereto, in step 1221, the processor 1050 of the power transmission device 310 transmits a ping initiation command (e.g., a command for preparing a ping signal application operation) for a plurality of coils to the first power transmitter 1001. The first power transmitter 1001 of the power transmission device 310 may control a switch based on the ping initiation command for the plurality of coils received from the processor 1050 and perform control to apply ping signals to the plurality of coils sequentially or in a predetermined pattern.

The first power transmitter 1001 of the power transmission device 310 may operate in a ping signal application operation mode.

More specifically, in step 1223, the first power transmitter 1001 of the power transmission device 310 transmits a ping signal of a second coil to the power receiver 321 of the power reception device 320.

In response thereto, in step 1225, the power receiver 321 of the power reception device 320 transmits information on an SSP of the second coil to the first power transmitter 1001 of the power transmission device 310.

In step 1227, the first power transmitter 1001 of the power transmission device 310 transmits, to the processor 1050, a signal requesting to store the information on the SSP of the second coil.

In step 1229, the processor 1050 of the power transmission device 310 stores the information on the SSP of the second coil 420.

In step 1231, the first power transmitter 1001 of the power transmission device 310 transmits a ping signal of a third coil to the power receiver 321 of the power reception device 320.

In response thereto, in step 1233, the power receiver 321 of the power reception device 320 transmits information on an SSP of the third coil to the first power transmitter 1001 of the power transmission device 310.

In step 1235, the first power transmitter 1001 of the power transmission device 310 transmits, to the processor 1050, a signal requesting to store the information on the SSP of the third coil.

In step 1237, the processor 1050 of the power transmission device 310 stores the information on the SSP of the third coil.

Referring to FIG. 12B, in step 1241, the processor 1050 of the power transmission device 310 transmits a ping initiation command (e.g., a command for preparing a ping signal application operation) for a plurality of coils to the second power transmitter 1021. The second power transmitter 1021 of the power transmission device 310 may control a switch based on the ping initiation command for the plurality of coils received from the processor 1050 and perform control to apply ping signals to the plurality of coils sequentially or in a predetermined pattern.

The second power transmitter 1021 of the power transmission device 310 may operate in a ping signal application operation mode.

More specifically, in step 1243, the second power transmitter 1021 of the power transmission device 310 transmits a ping signal of a fourth coil to the power receiver 321 of the power reception device 320.

In response thereto, in step 1245, the power receiver 321 of the power reception device 320 transmits information on an SSP of the fourth coil to the second power transmitter 1021 of the power transmission device 310.

In step 1247, the second power transmitter 1021 of the power transmission device 310 transmits, to the processor 1050, a signal requesting to store the information on the SSP of the fourth coil.

In step 1249, the processor 1050 of the power transmission device 310 stores the information on the SSP of the fourth coil.

In step 1251, the second power transmitter 1021 of the power transmission device 310 transmits a ping signal of a fifth coil to the power receiver 321 of the power reception device 320.

In response thereto, in step 1253, the power receiver 321 of the power reception device 320 transmits information on an SSP of the fifth coil to the second power transmitter 1021 of the power transmission device 310.

In step 1255, the second power transmitter 1021 of the power transmission device 310 transmits, to the processor 1050, a signal requesting to store the information on the SSP of the fifth coil.

In step 1257, the processor 1050 of the power transmission device 310 stores the information on the SSP of the fifth coil.

In step 1259, the second power transmitter 1021 of the power transmission device 310 transmits a ping signal of a sixth coil to the power receiver 321 of the power reception device 320.

In response thereto, in step 1261, the power receiver 321 of the power reception device 320 transmits information on an SSP of the sixth coil to the second power transmitter 1021 of the power transmission device 310.

In step 1263, the second power transmitter 1021 of the power transmission device 310 transmits, to the processor 1050, a signal requesting to store the information on the SSP of the sixth coil.

In step 1265, the processor 1050 of the power transmission device 310 stores the information on the SSP of the sixth coil 430 in operation 1265.

In step 1267, the processor 1050 of the power transmission device 310 determines (e.g., selects) a coil having the largest SSP to transmit power based on the stored SSPs of the first to sixth coils.

Herein, it is assumed that the coil having the largest SSP is arranged in a second area of the power transmission device 310. Accordingly, in step 1269, the processor 550 of the power transmission device 310 transmits a ping initiation command for the determined coil in the second area to the second power transmitter 1021 of the power transmission device 310 based on the largest SSP of one coil arranged in the second area of the power transmission device 310.

In step 1271, the second power transmitter 1021 of the power transmission device 310 transmits a ping signal of the determined coil to the power receiver 321 of the power reception device 320.

In response thereto, in step 1273, the power receiver 321 of the power reception device 320 transmits the SSP of the determined coil and identification information and configuration information of the power reception device 320 to the second power transmitter 1021 of the power transmission device 310.

In step 1274, the second power transmitter 1021 of the power transmission device 310 transmits a mode change interrupt to the processor 1050 of the power transmission device 310. For example, when entering a state in which power is wirelessly transmitted through a coil, the second power transmitter 1021 of the power transmission device 310 may transmit the mode change interrupt to the processor 1050.

In step 1275, the second power transmitter 1021 of the power transmission device 310 operates in a power transmission mode. For example, when it is identified that the coil change operation based on the mode change interrupt is completed by the processor 1050 of the power transmission device 310, the second power transmitter 1021 may operate in the power transmission mode, wherein power is wirelessly transmitted to the power reception device 320 through the determined coil.

Although FIGS. 12A and 12B have been described using an example in which the processor 1050 of the power transmission device 310 transmits the ping initiation command for a plurality of coils to the first power transmitter 1001 in step 1221 and transmits the same to the second power transmitter 1021 in step 1241, the disclosure is not limited thereto. For example, after transmitting the ping initiation command for a plurality of coils first to the second power transmitter 1021, the processor 1050 of the power transmission device 310 may transmit the same to the first power transmitter 1001.

As another example, the processor 1050 of the power transmission device 310 may sequentially transmit the ping initiation command for a plurality of coils to the first power transmitter 1001 and the second power transmitter 1021. In this case, after performing a ping operation of at least one coil in the first area 910 by controlling the first power transmitter 1001, the processor 1050 of the power transmission device 310 may perform a ping operation of at least one coil in the second area 920 by controlling the second power transmitter 1021.

Figure 13A:
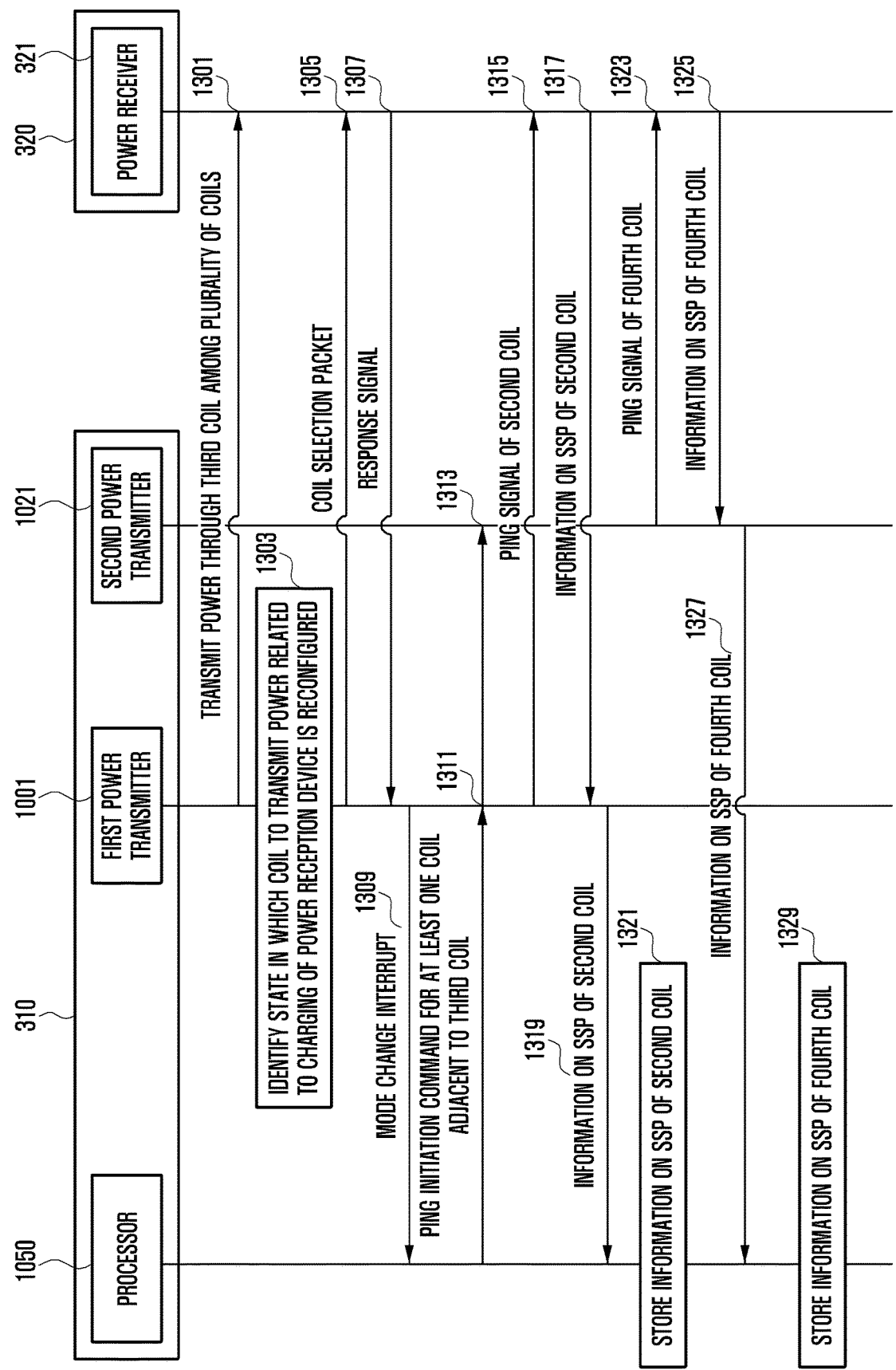
FIGS. 13A and 13B are signal flow diagrams illustrating operations of a power transmission device and a power reception device according to an embodiment.
Figure 13B:
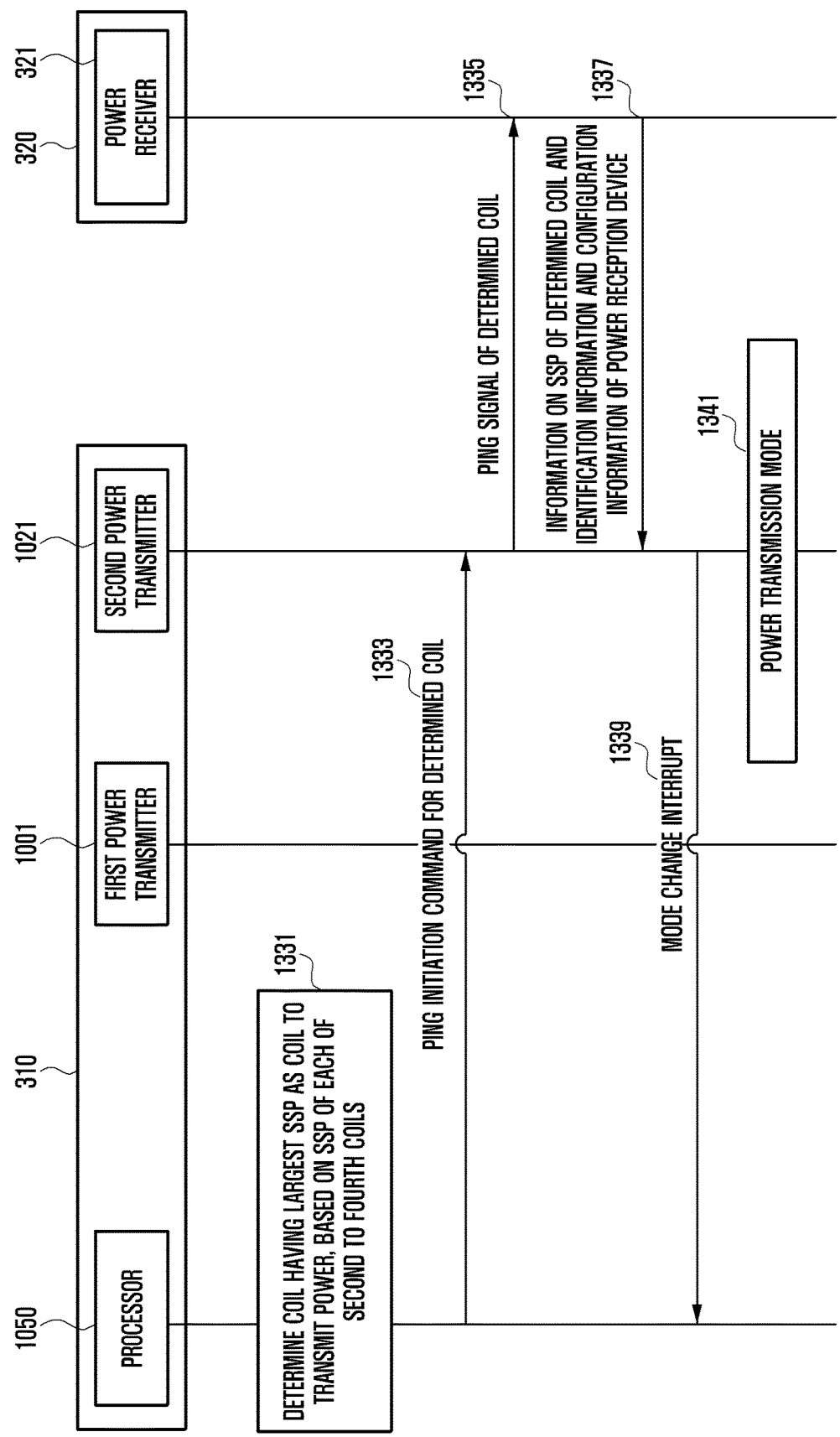

FIGS. 13A and 13B are signal flow diagrams illustrating operations of a power transmission device and a power reception device according to an embodiment.

Referring to FIGS. 13A and 13B, in step 1301, a first power transmitter 1001 of a power transmission device 310 wirelessly transmits power to a power receiver 321 of a power reception device 320 through a third coil among a plurality of coils.

Although FIGS. 13A and 13B will described below using an example in which the third coil is used for wirelessly transmitting power to the power reception device 320 in step 1301, this is only an example to make a description easier, and the disclosure is not limited thereto.

In step 1303, the first power transmitter 1001 of the power transmission device 310 identifies a state in which a coil to transmit power related to charging of the power reception device 320 is to be reconfigured.

In step 1305, the first power transmitter 1001 of the power transmission device 310 transmits a CSP to the power receiver 321 of the power reception device 320 based on identification of the state in which the coil to transmit power related to charging of the power reception device 320 is to be reconfigured.

In step 1307, the first power transmitter 1001 of the power transmission device 310 receives a response signal (e.g., a recognition of the state in which the first coil for transmitting power is to be reconfigured) from the power receiver 321 of the power reception device 320 based on the transmission of the CSP to the power receiver 321 of the power reception device 320.

In step 1309, the first power transmitter 1001 of the power transmission device 310 transmits a mode change interrupt to a processor 1050 of the power transmission device 310.

In response thereto, the processor 1050 of the power transmission device 310 transmits a ping initiation command (e.g., a command for preparing a ping signal application operation) for at least one coil adjacent to the third coil to the first power transmitter 1001 and the second power transmitter 1021 in steps 1311 and 1313, respectively.

The first power transmitter 1001 of the power transmission device 310 may perform control to apply a ping signal to at least one coil, e.g., a second coil, which adjacent to the third coil, by controlling a switch based on the ping initiation command for the at least one coil adjacent to the third coil received from the processor 1050.

The first power transmitter 1001 of the power transmission device 310 may operate in a ping signal application operation mode.

More specifically, in step 1315, the first power transmitter 1001 of the power transmission device 310 transmits a ping signal of the second coil 420 to the power receiver 321 of the power reception device 320.

In response thereto, in step 1317, the power receiver 321 of the power reception device 320 transmits information on an SSP of the second coil 420 to the first power transmitter 1001 of the power transmission device 310.

In step 1319, the first power transmitter 1001 of the power transmission device 310 transmits, to the processor 1050, a signal requesting to store the information on the SSP of the second coil.

In step 1321, the processor 1050 of the power transmission device 310 stores the information on the SSP of the second coil.

The second power transmitter 1021 of the power transmission device 310 may perform control to apply a ping signal to at least one coil, e.g., a fourth coil, which is adjacent to the third coil, by controlling a switch based on the ping initiation command for at least one coil adjacent to the third coil received from the processor 1050.

The second power transmitter 1021 of the power transmission device 310 may operate in a ping signal application operation mode.

More specifically, in step 1323, the second power transmitter 1021 of the power transmission device 310 transmits a ping signal of the fourth coil to the power receiver 321 of the power reception device 320.

In response thereto, in step 1325, the power receiver 321 of the power reception device 320 transmits information on an SSP of the fourth coil to the second power transmitter 1021 of the power transmission device 310.

In step 1327, the second power transmitter 1021 of the power transmission device 310 transmits, to the processor 1050, a signal requesting to store the information on the SSP of the fourth coil.

In step 1329, the processor 1050 of the power transmission device 310 stores the information on the SSP of the fourth coil.

Referring to FIG. 13B, in step 1331, the processor 1050 of the power transmission device 310 determines (e.g., select) a coil having the largest SSP to transmit power based on the stored SSPs of the second coil, the third coil, and the fourth coil.

Herein, it is assumed that the fourth coil arranged in a second area of the power transmission device 310 has the largest SSP.

In step 1333, the processor 1050 of the power transmission device 310 transmits a ping initiation command for the determined fourth coil in the second area to the second power transmitter 1021 of the power transmission device 310 based on the largest SSP of the fourth coil.

In step 1335, the second power transmitter 1021 of the power transmission device 310 may transmit a ping signal of the determined coil, e.g., the fourth coil, to the power receiver 321 of the power reception device 320.

In response thereto, the power receiver 321 of the power reception device 320 transmits the SSP for the fourth coil and identification information and configuration information of the power reception device 320 to the second power transmitter 1021 of the power transmission device 310 in step 1337.

In step 1339, the second power transmitter 1021 of the power transmission device 310 transmits a mode change interrupt to the processor 1050 of the power transmission device 310. For example, when entering a state in which power is wirelessly transmitted through a coil, the second power transmitter 1021 of the power transmission device 310 may transmit the mode change interrupt to the processor 1050.

In step 1341, the second power transmitter 1021 of the power transmission device 310 operates in a power transmission mode. For example, when it is identified that the coil change operation based on the mode change interrupt is completed by the processor 1050 of the power transmission device 310, the second power transmitter 1021 may operate in the power transmission mode, wherein power is wirelessly transmitted to the power reception device 320 through the determined fourth coil.

In accordance with the above-described embodiments, a power transmission device may include a power transmitter including a plurality of coils and a processor operatively connected to the power transmitter. The processor may be configured to wirelessly transmit power to the power reception device through at least one coil among the plurality of coils, identify a condition indicating a state in which a coil to transmit power related to charging of the power reception device is to be reconfigured, transmit a CSP to the power reception device when the state in which the coil to transmit power is to be reconfigured is identified based on the condition, identify an SSP of at least one other coil adjacent to the at least one coil, and wirelessly transmit power to the power reception device through a coil having a largest SSP among SSP of the at least one coil and SSP of the at least one other coil.

The condition may include a first condition indicating whether a power value required for charging received from the power reception device is larger than a predetermined charging power value, a second condition indicating whether a voltage value input into an inverter is larger than a predetermined voltage value or whether a current value input into the inverter is larger than a predetermined current value, a third condition indicating whether a power value received by the power reception device is less than or equal to a predetermined reception power value, and a fourth condition for identifying whether an amount of received power compared to an amount of output power is smaller than predetermined efficiency.

The condition may further include a fifth condition indicating whether a state in which at least one of the first to fourth conditions is satisfied is maintained for a predetermined time.

The processor may be further configured to identify the state in which the coil to transmit power related to charging of the power reception device is to be reconfigured based on satisfaction of the fifth condition.

The processor may be further configured to transmit a ping signal to the power reception device through the at least one other coil by temporarily applying power to the at least one other coil while power is wirelessly transmitted through the at least one coil and receive the SSP of the at least one other coil from the power reception device.

The processor may be further configured to store an SSP of the at least one coil for wirelessly transmitting power to the power reception device.

The plurality of coils may include a plurality of first coils and a plurality of second coils.

The power transmitter may include a first power transmitter including the plurality of coils and a second power transmitter including the plurality of second coils.

The plurality of first coils may be arranged in a first area of the power transmission device.

The plurality of second coils may be arranged in a second area of the power transmission device.

The processor may be further configured to wirelessly transmit power to the power reception device through at least one coil among the plurality of first coils based on the disposition of the power reception device in the first area of the power transmission device.

When the state in which the coil to transmit power is to be reconfigured is identified, the processor may be further configured to identify an SSP of at least one coil among the plurality of second coils (arranged in the second area adjacent to at least one coil among the plurality of first coils which are wirelessly transmitting power.

The processor may be further configured to wirelessly transmit power to the power reception device through a coil having a largest SSP among SSPs of at least one coil among the plurality of first coils and SSPs of at least one coil among the plurality of second coils.

The CSP may include information indicating a change in the at least one coil which is wirelessly transmitting power to the power reception device.

The processor may be further configured to receive a signal requesting selection of a specific coil among from the plurality of coils from the power reception device.

The state in which the coil to transmit power related to charging of the power reception device is to be reconfigured may include a state in which the power reception device is misaligned with the power transmission device.

In accordance with the above-described embodiments, a power reception device may include a power receiver including a plurality of reception coils and a processor operatively connected to the power receiver. The processor may be configured to wirelessly receive power from the power transmission device through the power receiver, identify whether, when the received power is smaller than a predetermined power value, a state in which the received power is smaller than the predetermined power value is maintained for a predetermined time, and transmit a CSP to the power transmission device based on maintenance of the state in which the received power is smaller than the predetermined power value for the predetermined time.

In accordance with the above-described embodiments, a method of performing wireless charging by a power transmission device may include wirelessly transmitting power to the power reception device through at least one coil among a plurality of coils, identifying a condition indicating a state in which a coil to transmit power related to charging of the power reception device is to be reconfigured, transmitting a CSP to the power reception device when the state in which the coil to transmit power is to be reconfigured is identified based on the condition, identifying an SSP of at least one other coil adjacent to the at least one coil, and wirelessly transmitting power to the power reception device through a coil having a largest SSP among SSP of the at least one coil and SSP of the at least one other coil.

Identifying the condition may include identifying a first condition indicating whether a power value required for charging received from the power reception device is larger than a predetermined charging power value, a second condition indicating whether a voltage value input into an inverter is larger than a predetermined voltage value or whether a current value input into the inverter is larger than a predetermined current value, a third condition indicating whether a power value received by the power reception device 320 is less than or equal to a predetermined reception power value, and a fourth condition for identifying whether an amount of received power compared to an amount of output power is smaller than predetermined efficiency.

Identifying the condition may further include identifying a fifth condition indicating whether a state in which at least one of the first to fourth conditions is satisfied is maintained for a predetermined time.

Identifying the SSP of the at least one other coil may include transmitting a ping signal to the power reception device through the at least one other coil by temporarily applying power to the at least one other coil while power is wirelessly transmitted through the at least one coil, and receiving the SSP of the at least one other coil from the power reception device.

When the plurality of coils include a plurality of first coils arranged in a first area of the power transmission device, identifying the SSP of the at least one other coil may include identifying an SSP of at least one coil among a plurality of second coils arranged in the second area of the power transmission device adjacent to at least one coil among the plurality of first coils which are wirelessly transmitting power.

Wirelessly transmitting power to the power reception device through the coil having the largest SSP may include wirelessly transmitting power to the power reception device through a coil having a largest SSP among SSP of at least one coil among the plurality of first coils and SSP of at least one coil among the plurality of second coils.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the above-described embodiments, when a power reception device is misaligned with a power transmission device, the power transmission device can change from a first coil transmitting power to the power reception device to a second coil having better efficiency. Accordingly, charging efficiency can be improved, and thus, heat of the power transmission device and the power reception device can be reduced and a time for charging the power reception device is prevented from increasing.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A power trans mission device, comprising:
 a power transmitter including a plurality of coils; and
 a processor configured to:
  wirelessly transmit power to a power reception device through at least one coil among the plurality of coils,
  identify a condition indicating a state in which a coil to transmit power related to charging of the power reception device is to be reconfigured,
  transmit a coil selection packet (CSP) to the power reception device, lased on satisfaction of the condition,
  identify a signal strength packet (SSP) of at least one other coil adjacent to the at least one coil, and
  wirelessly transmit power to the power reception device through a coil having a largest SSP among an SSP of the at least one coil and the identified SSP of the at least one other coil.

2. The power transmission device of claim 1, wherein the condition comprises:
 a first condition indicating whether a power value for charging, received from the power reception device, is larger than a predetermined charging power value;
 a second condition indicating whether a voltage value input into an inverter is larger than a predetermined voltage value or whether a current value input into the inverter is larger than a predetermined current value;

a third condition indicating whether a power value received by the power reception device is less than or equal to a predetermined reception power value; and a fourth condition for identifying whether an amount of received power, compared to an amount of output power, is smaller than a predetermined efficiency.

3. The power transmission device of claim 2, wherein the predetermined condition further comprises a fifth condition indicating whether a state in which at least one of the first to fourth conditions is satisfied is maintained for a predetermined time, and wherein the processor is further configured to identify the state in which the coil to transmit power related to charging of the power reception device is to be reconfigured, based on satisfaction of the fifth condition.

4. The power transmission device of claim 1, wherein the processor is further configured to:

transmit a ping signal to the power reception device through the at least one other coil by temporarily applying power to the at least one other coil while power is wirelessly transmitted through the at least one coil, and receive the SSP of the at least one other coil from the power reception device.

5. The power transmission device of claim 1, wherein the processor is further configured to store the SSP of the at least one coil.

6. The power transmission device of claim 1, wherein the plurality of coils include a plurality of first coils and a plurality of second coils, and wherein the power transmitter further includes a first power transmitter including the plurality of first coils and a second power transmitter including the plurality of second coils.

7. The power transmission device of claim 6, wherein the plurality of first coils are arranged in a first area of the power transmission device, and wherein the plurality of second coils are arranged in a second area of the power transmission device.

8. The power transmission device of claim 7, wherein the processor is further configured to wirelessly transmit power to the power reception device through at least one coil among the plurality of first coils, based on disposition of the power reception device in the first area of the power transmission device.

9. The power transmission device of claim 8, wherein the processor is further configured to, when the state in which the coil to transmit power is to be reconfigured is identified, identify an SSP of at least one coil among the plurality of second coils arranged in the second area adjacent to at least one coil among the plurality of first coils which are wirelessly transmitting power.

10. The power transmission device of claim 9, wherein the processor is further configured to wirelessly transmit power to the power reception device through a coil having a largest SSP among an SSP of at least one coil among the plurality of first coils and the SSP of the at least one coil among the plurality of second coils.

11. The power transmission device of claim 1, wherein the CSP includes information indicating a change in the at least one coil wirelessly transmitting power to the power reception device.

12. The power transmission device of claim 1, wherein the processor is further configured to receive, from the power reception device, a signal requesting selection of a specific coil among from the plurality of coils.

13. The power transmission device of claim 1, wherein the state in which the coil to transmit power related to charging of the power reception device is to be reconfigured includes a state in which the power reception device is misaligned with the power transmission device.

14. A power reception device, comprising:

a power receiver including a plurality of reception coils; and a processor configured to:

wirelessly receive power from a power transmission device through the power receiver, identify, when the received power is smaller than a predetermined power value, whether a state in which the received power is smaller than the predetermined power value is maintained for a predetermined time, and transmit a coil selection packet (CSP) to the power transmission device, in response to the state in which the received power is smaller than the predetermined power value being maintained for the predetermined time.

15. A method of performing wireless charging by a power transmission device, the method comprising:

wirelessly transmitting power to a power reception device through at least one coil among a plurality of coils;

identifying a condition indicating a state in which a coil to transmit power related to charging of the power reception device is to be reconfigured;

transmitting a coil selection packet (CSP) to the power reception device, based on satisfaction of the condition;

identifying a signal strength packet (SSP) of at least one other coil adjacent to the at least one coil; and wirelessly transmitting power to the power reception device through a coil having a largest SSP among an SSP of the at least one coil and the identified SSP of the at least one other coil.

16. The method of claim 15, wherein identifying the condition comprises identifying at least one of a first condition indicating whether a power value required for charging received from the power reception device is larger than a predetermined charging power value, a second condition indicating whether a voltage value input into an inverter is larger than a predetermined voltage value or whether a current value input into the inverter is larger than a predetermined current value, a third condition indicating whether a power value received by the power reception device is less than or equal to a predetermined reception power value, or a fourth condition for identifying whether an amount of received power, compared to an amount of output power, is smaller than a predetermined efficiency.

17. The method of claim 16, wherein identifying the predetermined condition further comprises identifying a fifth condition indicating whether a state in which at least one of the first to fourth conditions is satisfied is maintained for a predetermined time.

18. The method of claim 15, wherein identifying the SSP of the at least one other coil comprises:

transmitting a ping signal to the power reception device through the at least one other coil by temporarily applying power to the at least one other coil while power is wirelessly transmitted through the at least one coil; and receiving the SSP of the at least one other coil from the power reception device.

19. The method of claim 15, wherein, when the plurality of coils include a plurality of first coils arranged in a first area of the power transmission device, identifying the SSP of the at least one other coil comprises identifying an SSP of at least one coil among a plurality of second coils arranged in a second area of the power transmission device adjacent to at least one coil among the plurality of first coils which are wirelessly transmitting power.

20. The method of claim 19, wherein wirelessly transmitting power to the power reception device through the coil having the largest SSP comprises wirelessly transmitting power to the power reception device through a coil having a largest SSP among an SSP of at least one coil among the plurality of first coils and the SSP of the at least one coil among the plurality of second coils.

* * * * *